(12) United States Patent
Inagaki

(10) Patent No.: US 6,856,439 B2
(45) Date of Patent: Feb. 15, 2005

(54) TANDEM-TYPE LASER SCANNING APPARATUS

(75) Inventor: Yoshihiro Inagaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/636,762

(22) Filed: Aug. 8, 2003

(65) Prior Publication Data

US 2004/0032632 A1 Feb. 19, 2004

(30) Foreign Application Priority Data

Aug. 9, 2002 (JP) ........................................ 2002-232391

(51) Int. Cl.$^7$ ............................................. G02B 26/08
(52) U.S. Cl. ........................................................ 359/204
(58) Field of Search ................................. 359/204–218; 347/225, 233, 241–244

(56) References Cited

U.S. PATENT DOCUMENTS 5,245,462 A * 9/1993 Kanai et al. ................ 359/204
5,801,746 A * 9/1998 Yamaguchi et al. ........ 347/259
6,304,360 B1  10/2001 Sekikawa

FOREIGN PATENT DOCUMENTS

JP    2000-180749    6/2000

* cited by examiner

Primary Examiner—Euncha P. Cherry
(74) Attorney, Agent, or Firm—Burns, Doane, Swecker & Mathis, L.L.P.

(57) ABSTRACT

A tandem-type laser scanning apparatus has a deflector for deflecting a first laser beam and a second laser beam, which fulfill prescribed conditions, in the main scanning direction by reflecting the laser beams simultaneously with a single surface and a scanning optical system for directing the deflected first and second laser beams to separate scanned surfaces corresponding thereto in such a way that the scanned surfaces are individually scanned with the laser beams focused thereon. The scanning optical system includes a common lens that has no curvature in the sub scanning direction and that transmits both the first and second laser beams, a first scanning lens that transmits, of the first and second laser beams transmitted through the common lens, the first laser beam but not the second laser beam, and a second scanning lens that transmits, of the first and second laser beams transmitted through the common lens, the second laser beam but not the first laser beam. The first and second scanning lenses each have a surface having a different twist from each other.

16 Claims, 16 Drawing Sheets

TANDEM-TYPE LASER SCANNING APPARATUS

This application is based on Japanese Patent Application No. 2002-232391 filed on Aug. 9, 2002, the contents of which are hereby incorporated by reference.

BACKGROUND OF THE INVENTION

1. Field of the Invention

The present invention relates to a tandem-type laser scanning apparatus, and more specifically to a tandem-type laser scanning apparatus that is used in an image formation apparatus such as a color laser printer or color digital copier to record an image on a plurality of scanned surfaces by scanning them with a plurality of laser beams in such a way that the scanned surfaces are individually exposed to the laser beams.

2. Description of the Prior Art

U.S. Pat. No. 6,304,360 proposes a tandem-type laser scanning apparatus that forms a color image fast by scanning a plurality of photoconductors with a plurality of laser beams directed thereto by being deflected with a single deflector in such a way that the photoconductors are individually exposed to the laser beams.

The laser scanning apparatus mentioned above is so constructed that a plurality of laser beams are incident on the deflector at different angles in the sub scanning direction. This is to ease the separation of the optical paths of the individual laser beams. As a result, when the individual laser beams are incident on the deflector, they suffer different degrees of bow and wavefront twist. It is difficult to correct bow and wavefront twist simultaneously. Different degrees of bow in the individual laser beams result in color dislocation in the produced color image. On the other hand, uncorrected wavefront twist results in an unduly large beam spot, making the produced image unsharp.

SUMMARY OF THE INVENTION

An object of the present invention is to provide a tandem-type laser scanning apparatus that can form a high-precision color image fast with satisfactorily corrected bow and wavefront twist in all of a plurality of laser beams.

To achieve the above object, according to the present invention, a tandem-type laser scanning apparatus is provided with: a deflector for deflecting a first laser beam and a second laser beam in the main scanning direction by reflecting the laser beams simultaneously with a single surface, assuming that the first and second laser beams fulfill the following conditions: $|\alpha| \neq |\beta|$, $\alpha \neq 0$, and $\beta \neq 0$, where $\alpha$ represents the angle that the principal ray of the first laser beam makes with the main scanning plane when the first laser beam is incident on the deflector, and $\beta$ represents the angle that the principal ray of the second laser beam makes with the main scanning plane when the second laser beam is incident on the deflector; and a scanning optical system for directing the deflected first and second laser beams to separate scanned surfaces corresponding thereto in such a way that the scanned surfaces are individually scanned with the laser beams focused thereon. Here, the scanning optical system includes: a common lens that has no curvature in the sub scanning direction and that transmits both the first and second laser beams; a first scanning lens that transmits, of the first and second laser beams transmitted through the common lens, the first laser beam but not the second laser beam; and a second scanning lens that transmits, of the first and second laser beams transmitted through the common lens, the second laser beam but not the first laser beam. The first and second scanning lenses each have a surface having a different twist from each other.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
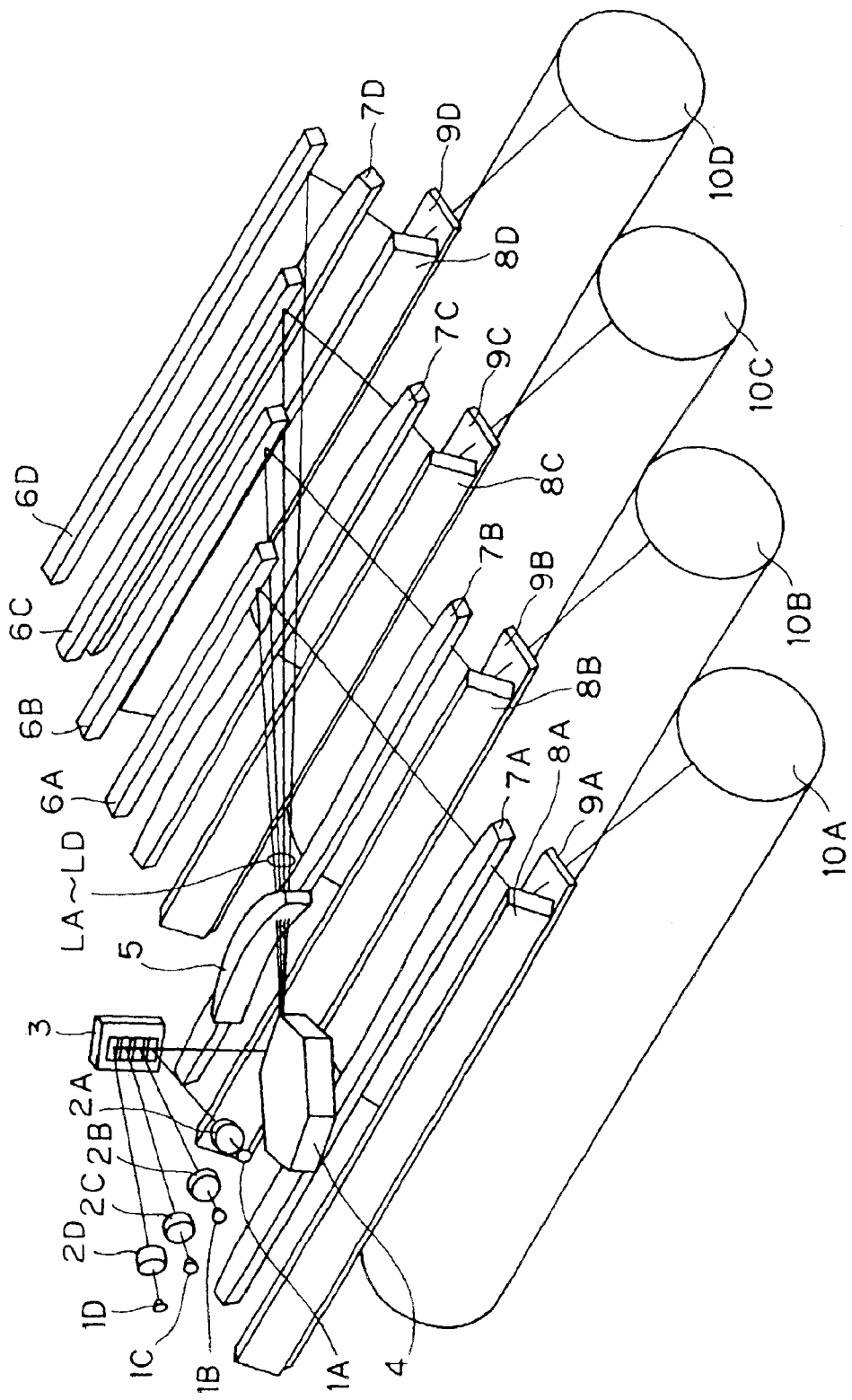
FIG. 1 is a perspective view schematically showing the construction of a laser scanning apparatus (Practical Example 1) embodying the invention.

Hereinafter, laser scanning apparatuses embodying the present invention will be described with reference to the drawings. FIG. 1 shows a tandem-type laser scanning apparatus (Practical Example 1) embodying the invention for use in a color image formation apparatus (for example, a color laser printer, color digital copier, or the like). In FIG. 1, reference symbols 1A to 1D represent laser diodes, reference symbols 2A to 2D represent collimator lenses, reference symbol 3 represents a free-form-surface mirror array, reference symbol 4 represents a polygon mirror, reference symbol 5 represents a first lens, reference symbols 6A to 6D represent first turning mirrors, reference symbols 7A to 7D represent second lenses, reference symbols 8A to 8D represent second turning mirrors, reference symbols 9A to 9D represent window glass plates, reference symbols 10A to 10D represent photoconductors that provide scanned surfaces, and reference symbol LA to LD represent laser beams. In this laser scanning apparatus, the direction in which the laser beams LA to LD scans the photoconductors 10A to 10D is referred to as the main scanning direction, and the direction perpendicular to both the main scanning direction and the direction normal to the scanned surfaces is referred to as the sub scanning direction.

The laser scanning apparatus shown in FIG. 1 is provided with four photoconductors 10A to 10D on which images of different colors, namely Y (yellow), M (magenta), C (cyan), and K (black), are formed. By transferring the images formed on the four photoconductors 10A to 10D to a single sheet of paper, a color image is formed. As light sources for forming images individually on the four photoconductors 10A to 10D, there are provided four laser diodes 1A to 1D. The laser beams LA to LD emitted from the four laser diodes 1A to 1D are individually formed into parallel beams by collimator lenses 2A to 2B provided one for each of the laser beams LA to LD, and are then made to converge on a polygon mirror 4 only in the sub scanning direction by a free-form-surface mirror array 3. The polygon mirror 4 is a deflector that deflects the laser beams LA to LD in the main scanning direction by reflecting them simultaneously with a single surface, and the laser beams LA to LD are incident on the deflecting-reflecting surface of the polygon mirror 4 at different angles from one another in the sub scanning direction. The laser beams LA to LD thus deflected by being reflected by the polygon mirror 4 then enter a scanning optical system.

The scanning optical system is composed of a first lens 5, first turning mirrors 6A to 6D, second lenses 7A to 7D, second turning mirrors 8A to 8D, and window glass plates 9A to 9D. The scanning optical system directs the deflected laser beams LA to LD separately to the corresponding photoconductors 10A to 10D so that the scanned surfaces of the photoconductors 10A to 10D are individually scanned with the laser beams LA to LD focused thereon. The first lens 5 is a common lens that has no curvature (and thus no optical power) in the sub scanning direction and that transmits all the four laser beams LA to LD. The four laser beams LA to LD thus refracted by the first lens 5 are then individually reflected by the four first turning mirrors 6A to 6D, and thereby their optical paths are separated. The laser beams LA to LD, thus having their optical paths separated, are then individually transmitted through the four second lenses 7A to 7D, and are then individually reflected by the second turning mirrors 8A to 8D. The laser beams LA to LD are then individually transmitted through the window glass plates 9A to 9D, and are then made to converge on the corresponding photoconductors 1A to 10D so that the photoconductors 10A to 10D are individually scanned by being exposed to the laser beams LA to LD.

The laser scanning apparatus described above is so constructed that each photoconductor (one of 10A to 10D) is scanned with and thereby exposed to a single laser beam (one of LA to LD) emitted from a single laser diode (one of 1A to 1D). It is, however, also possible to adopt any other construction. For example, each photoconductor may be scanned with and thereby exposed to two or more laser beams emitted from a light source of a multibeam type.

As described above, the scanning optical system directs the four laser beams LA to LD separately, i.e., one by one, to the four phtoconductors 10A to 10D, and then makes the individual laser beams LA to LD to converge so as to form spots on the photoconductors 10A to 10D so that the photoconductors 10A to 10D are individually scanned with the laser beams LA to LD by being exposed thereto. Thus, the scanning optical system can be regarded as consisting of four scanning optical systems (a first to a fourth scanning optical system) that act on the laser beams LA to LD, respectively. An example (Practical Example 1) of the scanning optical system used in the laser scanning apparatus shown in FIG. 1 is presented in FIGS. 2A and 2B to 5A and 5B, which show the main scanning section (FIGS. 2A, 3A, 4A, and 5A) and sub scanning section (FIGS. 2B, 3B, 4B, and 5B) of the first to fourth scanning optical systems, respectively, of Practical Example 1, and in Tables 1 to 8, which show the construction data of the first to fourth scanning optical systems of Practical Example 1. It should be noted here that no data is given for a mirror surface having no curvature, and that the optical construction is presented in a state in which its optical path is straightened (i.e., assuming that no bending of the optical path by a reflective surface having no curvature occurs).

Tables 1, 3, 5, and 7 show, out of the construction data of the first to fourth scanning optical systems, respectively, of Practical Example 1, the coordinates (mm) of the optical surfaces. These coordinates indicate the location of each optical surface (of which the vertex is used as its reference point), and are given as the coordinates of the origin and the vectors of the axes of a local rectangular coordinate system (x, y, and z) with respect to the global rectangular coordinate system (X, Y, and Z), as evaluated on the surface (evaluation surface) of the corresponding photoconductor (one of 10A to 10D). On the other hand, Tables 2, 4, 6, and 8 show the surface shapes of the optical surfaces constituting the first to fourth scanning optical systems, respectively, of Practical Example 1 (in these tables, "E-n" represents "×10$^{-n}$," and no data is given for an optical surface that is flat or for the evaluation surfaces). Here, all the surfaces for which their surface shape data $a_{ij}$ is shown are free-form surfaces, of which the surface shape is defined by formula (FS) below. It should be noted here that any coefficient $a_{ij}$ that does not appear in the tables equals 0, and that all the lenses used in the scanning optical systems are made of an optical material having a refractive index of 1.52440.

$$x = \sum_{i=0}^{10} \sum_{j=0}^{2} a_{ij} y^i z^j \quad \text{(FS)}$$

As Tables 1 to 8 show, since the first lens 5 is common to the first to fourth scanning optical systems of Practical Example 1, it has the same coordinates and surface shapes in all those scanning optical systems. On the other hand, the second lenses 7A to 7D in the first to fourth scanning optical systems of Practical Example 1 have different coordinates and surface shapes from one another. In the first lens 5, the coefficient at in formula (FS) equals zero for all terms with j>0 on either of its surfaces, and thus formula (FS), which defines the surface shape, is reduced to a function of y alone. That is, determining the value of y alone results in determining the value of x irrespective of the value of z. This means that the first lens 5 is composed of surfaces that have no inclination nor curvature in the sub scanning direction. On the other hand, in the second lenses 7A to 7D, the coefficient $a_{ij}$ does not always equal zero for terms with j=1. Thus, the entrance-side surface (surface number 3) of the second lenses 7A to 7D has an inclination in the sub scanning direction, and in addition the inclination varies according to the position in the main scanning direction. Moreover, the coefficient $a_{ij}$ does not always equal zero for terms with j=2, either. Thus, the entrance-side surface (surface number 3) of the second lenses 7A to 7D has a curvature in the sub scanning direction, and in addition the curvature varies according to the position in the main scanning direction.

Figure 6:
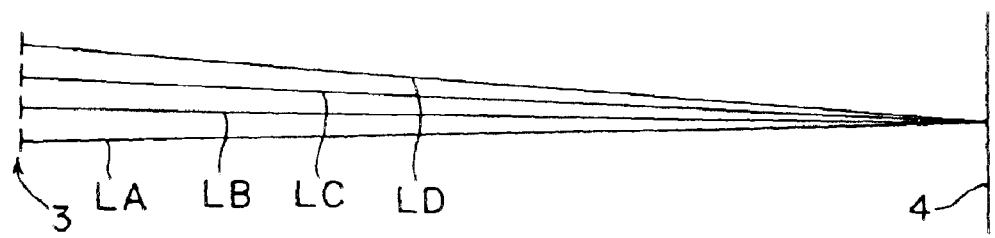
FIG. 6 is an optical path diagram showing the principal rays of the laser beams, as observed in the sub scanning section, that are incident on the polygon mirror in the laser scanning apparatus shown in FIG. 1.

FIG. 6 shows the principal rays of the laser beams LA to LD, as observed in the sub scanning section, that are incident on the polygon mirror 4 in the laser scanning apparatus shown in FIG. 1. The four laser beams LA to LD are incident on the polygon mirror 4 at different angles in the sub scanning direction but at roughly equal heights. Moreover, of the four laser beams LA to LD, the outer two LA and LD are incident at angles with equal absolute values in the sub scanning direction, and the inner two LB and LC are incident at angles with equal absolute values in the sub scanning direction.

Figure 7:
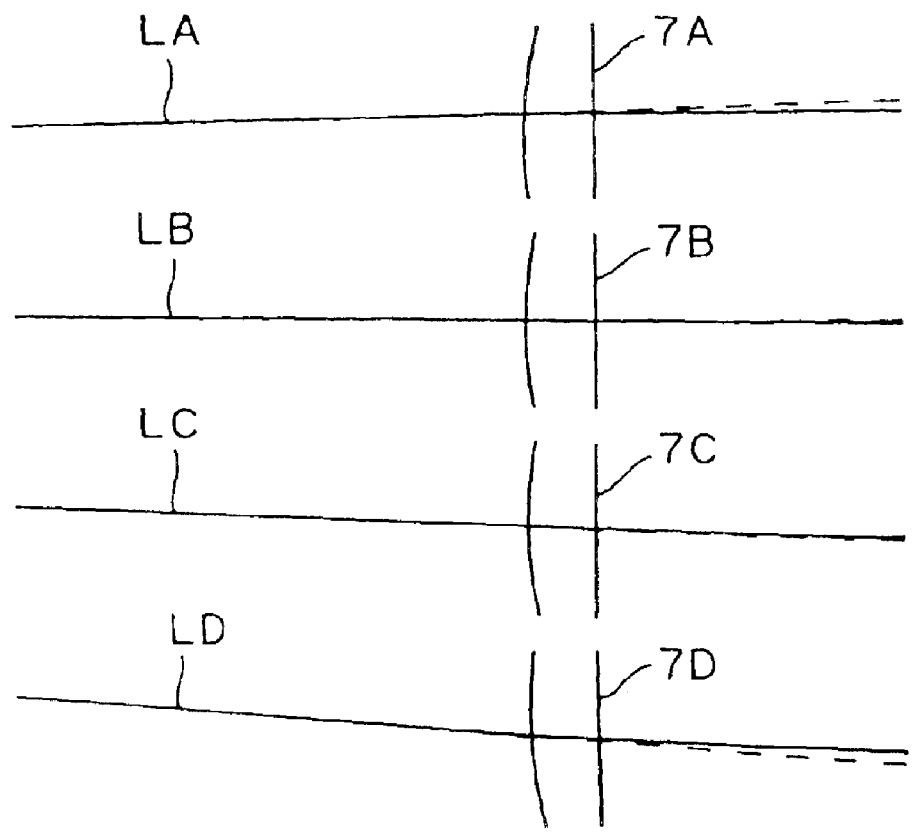
FIG. 7 is an optical path diagram showing the principal rays of the laser beams, as observed in the sub scanning section, that enter and exit from the second lenses at a deflection angle corresponding to the center of the image in the first to fourth scanning optical systems shown in FIGS. 2A and 2B to 5A and 5B.

FIG. 7 shows the principal rays of the laser beams LA to LD, as observed in the sub scanning section, that enter and exit from the second lenses 7A to 7D at a deflection angle corresponding to the center of the image in the first to fourth scanning optical systems (FIGS. 2A and 2B to 5A and 5B). In FIG. 7, broken lines represent extension lines of the laser beams LA to LD that are incident on the second lenses 7A to 7D. The difference in angle between the incident and emergent laser beams is greater in the outer laser beams LA and LD than in the inner laser beams LB and LC. It should be noted here that, since the first lens 5 has no curvature in the sub scanning direction, the angle (the absolute values thereof) in the sub scanning direction at which the laser beams LA to LD are incident on the second lenses 7A to 7D are equal to those at which they are incident on the polygon mirror 4.

In FIG. 7, let the angle that the principal ray of the uppermost laser beam LA makes with the main scanning plane when it is incident on the polygon mirror 4 be α, and let the angle that the principal ray of the uppermost laser beam LA makes with the main scanning plane when it exits from the second lens 7A at the deflection angle corresponding to the center of the image be α'. Then, α=2.8 and α'=1.1 (both in degrees). Moreover, in FIG. 7, let the angle that the principal ray of the second laser beam LB as counted from top down makes with the main scanning plane when it is incident on the polygon mirror 4 be β, and let the angle that the principal ray of the second laser beam LB as counted from top down makes with the main scanning plane when it exits from the second lens 7B at the deflection angle corresponding to the center of the image be β'. Then, β=0.92 and β'=0.42 (both in degrees). Here, the difference between α and α' differs from the difference between β and β', which but the ratio of α to α' is close to the ratio of β to β', That is, (αβ')/(α'β)=1.1, is close to 1.

Figure 2A:
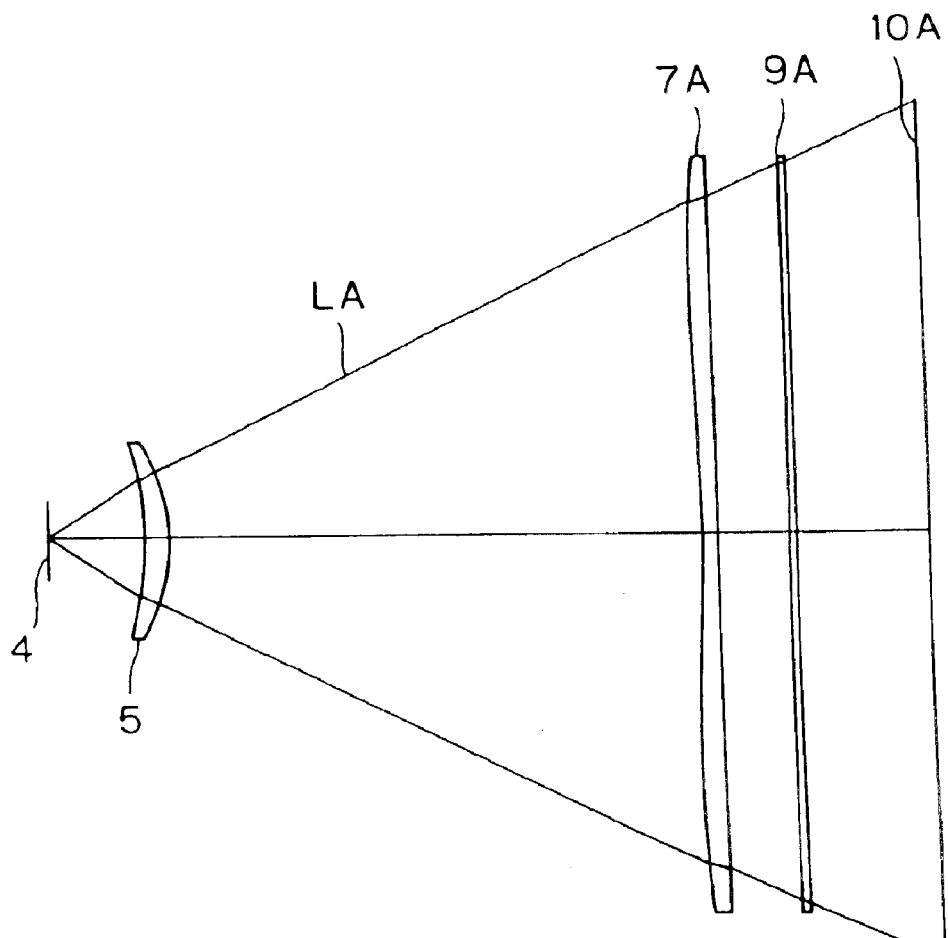
FIGS. 2A and 2B are optical construction diagrams showing the main and sub scanning sections, respectively, of a first scanning optical system used in the laser scanning apparatus shown in FIG. 1.
Figure 2B:
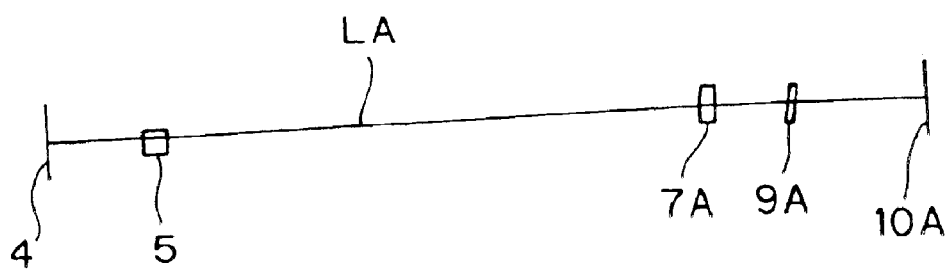
Figure 3A:
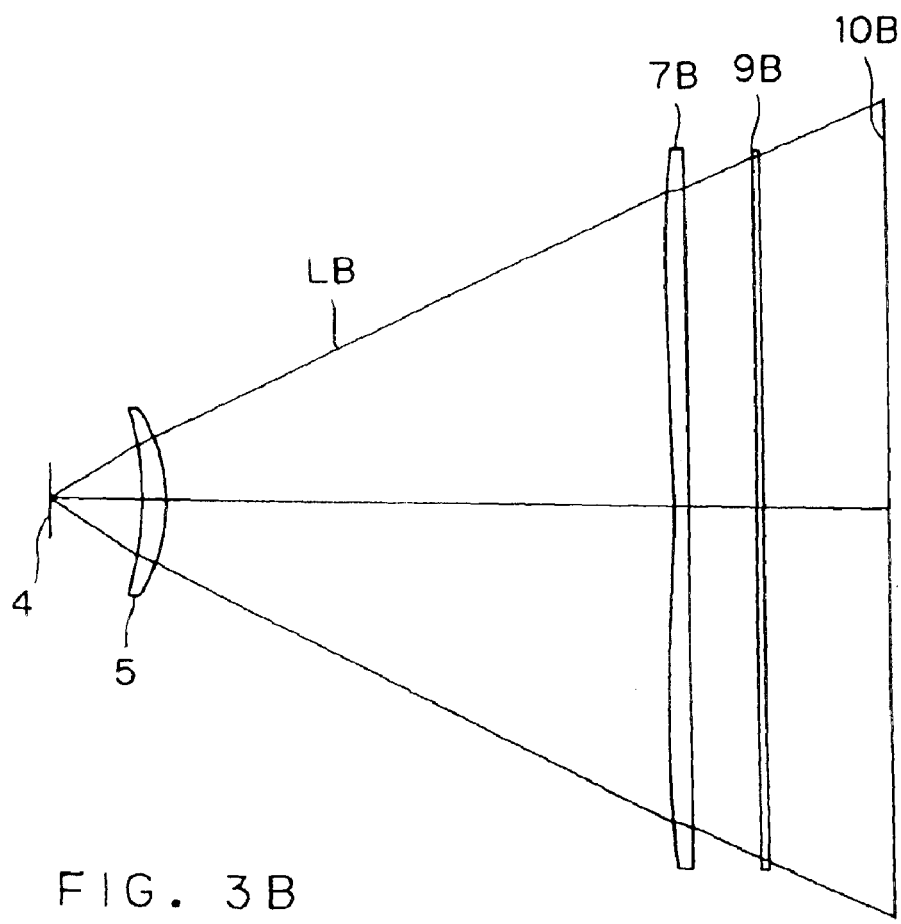
FIGS. 3A and 3B are optical construction diagrams showing the main and sub scanning sections, respectively, of a second scanning optical system used in the laser scanning apparatus shown in FIG. 1.
Figure 3B:
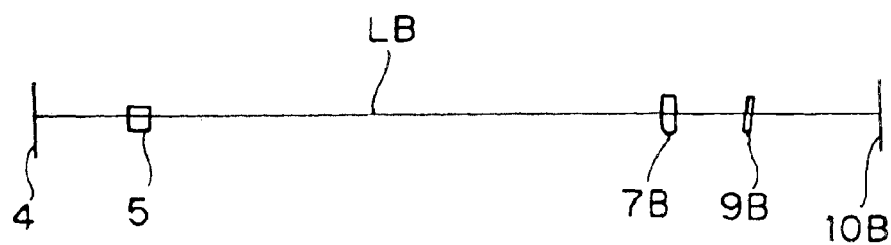
Figure 4A:
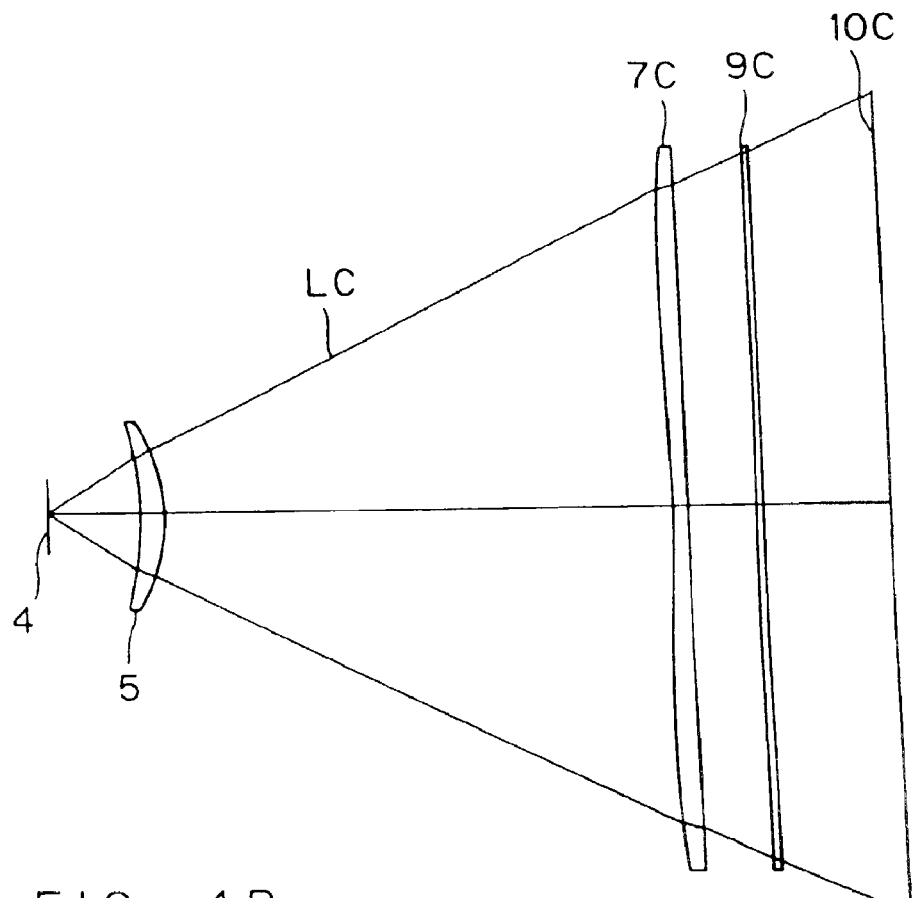
FIGS. 4A and 4B are optical construction diagrams showing the main and sub scanning sections, respectively, of a third scanning optical system used in the laser scanning apparatus shown in FIG. 1.
Figure 4B:
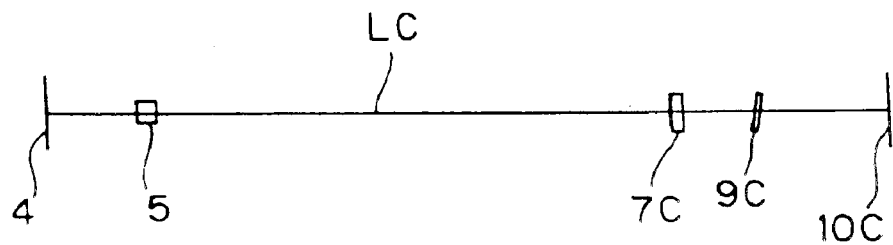
Figure 5A:
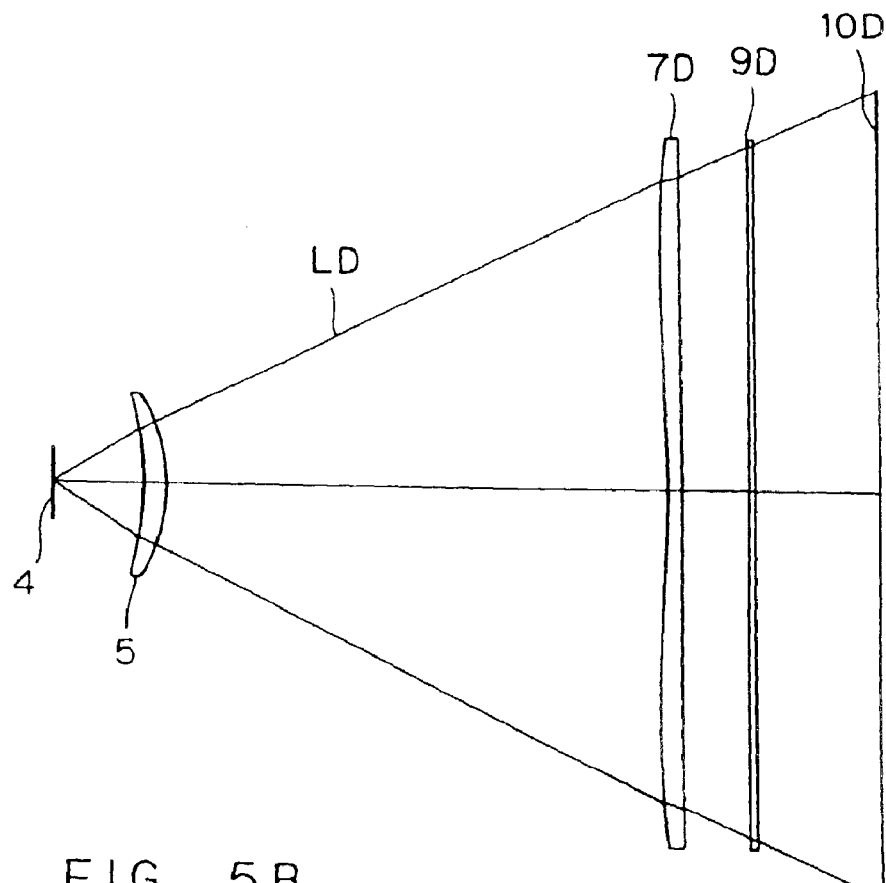
FIGS. 5A and 5B are optical construction diagrams showing the main and sub scanning sections, respectively, of a fourth scanning optical system used in the laser scanning apparatus shown in FIG. 1.
Figure 5B:
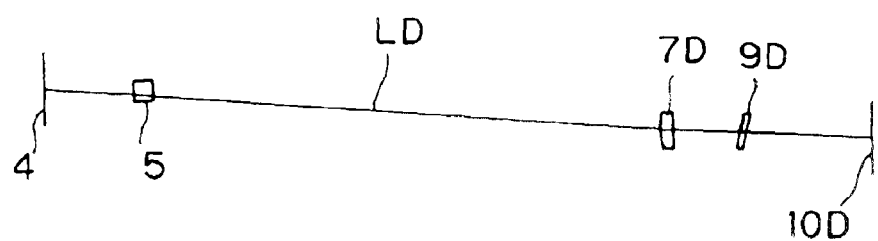
Figure 8:
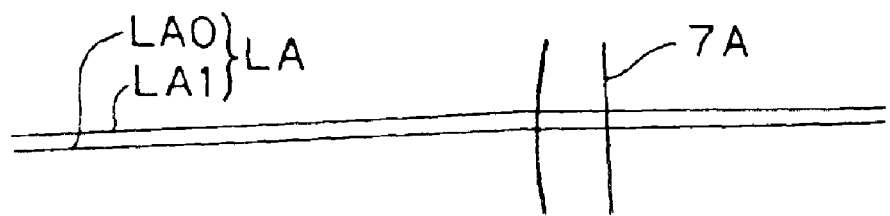
FIG. 8 is an optical path diagram showing the principal rays of the laser beams, as observed in the sub scanning section, that enter and exit from the second lens at deflection angles corresponding to the center and end of the image in the first scanning optical system shown in FIGS. 2A and 2B.

FIG. 8 shows the principal rays of the laser beams LA0 and LA1, as observed in the sub scanning section, that enter and exit from the second lenses 7A at the deflection angles corresponding to the center and end, respectively, of the image in the first scanning optical system (FIGS. 2A and 2B). FIG. 8 shows that the laser beam LA1 that is incident on the second lens 7A at the deflection angle corresponding to the end of the image is refracted more than the laser beam LA0 that is incident on the second lens 7A at the deflection angle corresponding to the center of the image.

The distances from the polygon mirror 4 to the second turning mirrors 8A to 8D are longer at the end of the image than at the center of the image. This, combined with the facts that the laser beams incident on the polygon mirror 4 have inclinations in the sub scanning direction and that the first lens 5 has no curvature in the sub scanning direction, causes differences, between at the center and end of the image, in the height at which the laser beams are incident on the second lenses 7A to 7D. Thus, relative to the height at which the laser beams are incident on the polygon mirror 4, the laser beams LA to LD are incident on the second lenses 7A to 7D at more deviated heights at the end of the image. As will be understood from the relationships $\alpha > \alpha'$ and $\beta > \beta'$ noted above, at the center of the image, the second lenses 7A to 7D refract the laser beams LA to LD in such a way as to reduce the angles that their principal rays make with the main scanning plane. To eliminate bow on the photoconductors 10A to 10D, however, the laser beams need to be refracted more at the end of the image at which they are incident on the second lenses 7A to 7D at greater heights.

In FIG. 7, let the angle that the principal ray of the topmost laser beam LA makes with the main scanning plane when it exits from the second lens 7A at the deflection angle corresponding to the end of the image be $\alpha''$. Then, $\alpha''=0.29$ (in degrees). Thus, $\alpha''/\alpha'=0.27$. That is, the ratio of the angle observed at the end of the image to that observed at the center of the image is close to zero. Likewise, in FIG. 7, let the angle that the principal ray of the second laser beam LB as counted from top down makes with the main scanning plane when it exits from the second lens 7B at the deflection angle corresponding to the end of the image be $\beta''$. Then, $\beta''=0.14$ (in degrees). Thus, $\beta''/\beta'=0.35$. Incidentally, simply to correct bow, the laser beams LA to LD do not need to be refracted by the second lenses 7A to 7D in such a way as to reduce the angles that they make with the main scanning plane, but there only need to be differences between at the center and end of the image.

The laser scanning apparatus described above can be generalized, in terms of its features, in the manner described below. For example, in FIG. 7, assume that the topmost laser beam LA is called the first laser beam, and that the second laser beam LB as counted from top downward is called the second laser beam. Moreover, assume that the polygon mirror 4 is a deflector that deflects the first and second laser beams by reflecting them simultaneously with a single surface, and that the first and second laser beams fulfill conditions (1) to (3) below.

$$|\alpha| \neq |\beta| \quad (1)$$

$$\alpha \neq 0 \quad (2)$$

$$\beta \neq 0 \quad (3)$$

where
- $\alpha$ represents the angle that the principal ray of the first laser beam makes with the main scanning plane when the first laser beam is incident on the deflector; and
- $\beta$ represents the angle that the principal ray of the second laser beam makes with the main scanning plane when the second laser beam is incident on the deflector.

Moreover, assume that the first lens 5 of the scanning optical systems is a common lens that has no curvature in the sub scanning direction and that transits both the first and second laser beams, that the second lens 7A of the first scanning optical system is called the first scanning lens, and that the second lens 7B of the second scanning optical system is called the second scanning lens. Furthermore, assume that the first and second scanning lenses each transmit, of the first and second laser beams transmitted through the common lens, only one and not the other. Then, one feature of a laser scanning apparatus embodying the invention is that the first and second scanning lenses each have a surface having a different twist from each other.

The first scanning lens is so designed as to transmit, of the first and second laser beams that have their optical paths separated, only the first and not the second, and the second scanning lens is so designed as to transmit, of the first and second laser beams that have their optical paths separated, only the second and not the first. Hence, in a laser scanning apparatus in which the first and second laser beams fulfill conditions (1) to (3), by constructing the scanning optical systems in such a way that the first and second scanning lenses each have a surface having a different twist from each other, it is possible to give the first and second scanning lenses surfaces having the optimum degrees of twist to correct bow and wavefront twist according to the angles in the sub scanning direction at which the first and second laser beams are incident on the deflector. This makes it possible, in each of the first and second laser beams, to satisfactory correct both bow and wavefront twist. Through this correction, it is possible to make the degrees of bow in the individual laser beams equal, and thereby prevent color dislocation in the produced color image. Moreover, it is possible to correct wavefront twist, and thereby obtain small beam spots and thus a sharp image. In this way, it is possible to form a high-precision color image fast.

For satisfactory correction of wavefront twist, it is preferable that condition (4) be, fulfilled. For satisfactory correction of both bow and wavefront twist, it is preferable that condition (5) below be fulfilled. For satisfactory correction of bow, it is preferable that conditions (6) and (7) below be fulfilled. Simply to correct bow, the first and second laser beams do not need to be refracted by the first and second scanning lenses in such a way as to reduce the angles that they make with the main scanning plane, but there only need to be such differences in angle between at the center and end of the image as defined by conditions (6) and (7). It should be noted, however, that, since conditions (4) to (7) define conditions for satisfactory correction of both bow and wavefront twist, if any of the ranges defined by conditions (4) to (7) is transgressed, it is difficult to satisfactory correct both bow and wavefront twist.

$$\alpha - \alpha' \neq \beta - \beta' \quad (4)$$

$$0.8 < (\alpha\beta')/(\alpha'\beta) < 1.25 \quad (5)$$

$$|\alpha''/\alpha'| < 0.5 \quad (6)$$

$$|\beta''/\beta'| < 0.5 \quad (7)$$

where, assuming that no bending of the optical path by a reflective surface having no curvature occurs in the scanning optical systems,
- $\alpha'$ represents the angle that the principal ray of the first laser beam makes with the main scanning plane when it exits from the first scanning lens at the deflection angle corresponding to the center of the image;

β' represents the angle that the principal ray of the second laser beam makes with the main scanning plane when it exits from the second scanning lens at the deflection angle corresponding to the center of the image;

α" represents the angle that the principal ray of the first laser beam makes with the main scanning plane when it exits from the first scanning lens at the deflection angle corresponding to the end of the image; and β" represents the angle that the principal ray of the second laser beam makes with the main scanning plane when it exits from the second scanning lens at the deflection angle corresponding to the end of the image.

Figure 9:
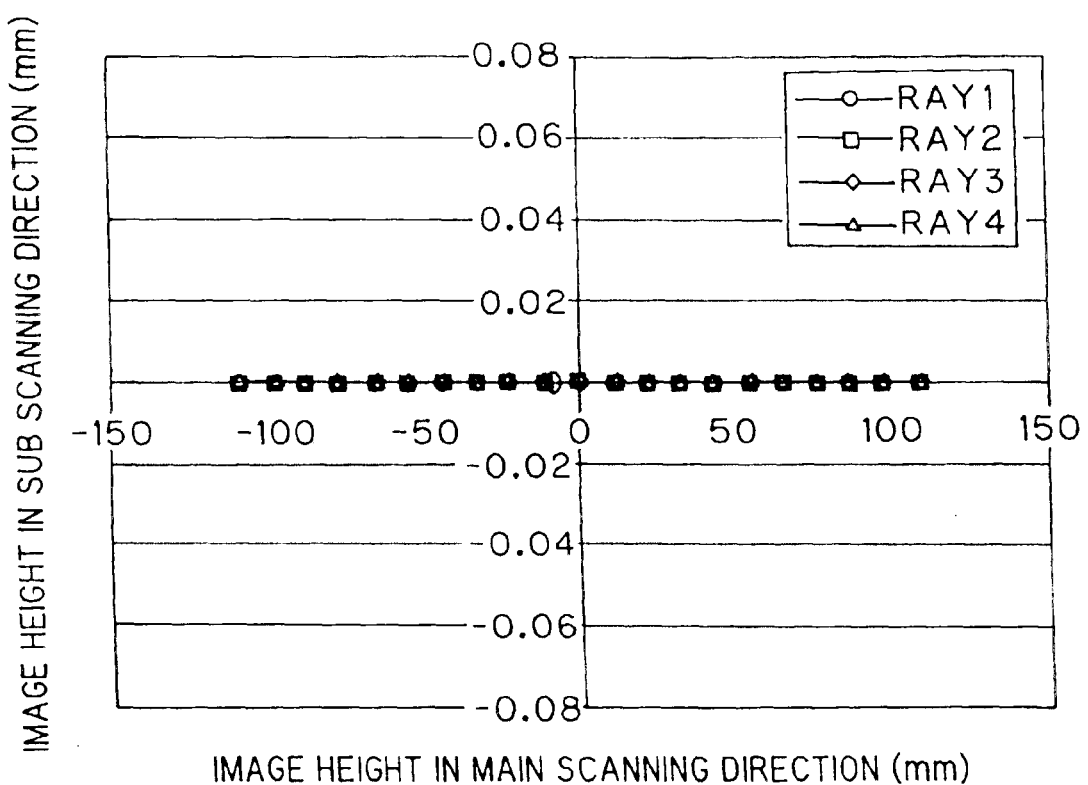
FIG. 9 is a graph showing the image height in the sub scanning direction observed in the first to fourth scanning optical systems shown in FIGS. 2A and 2B to 5A and 5B.
Figure 10:
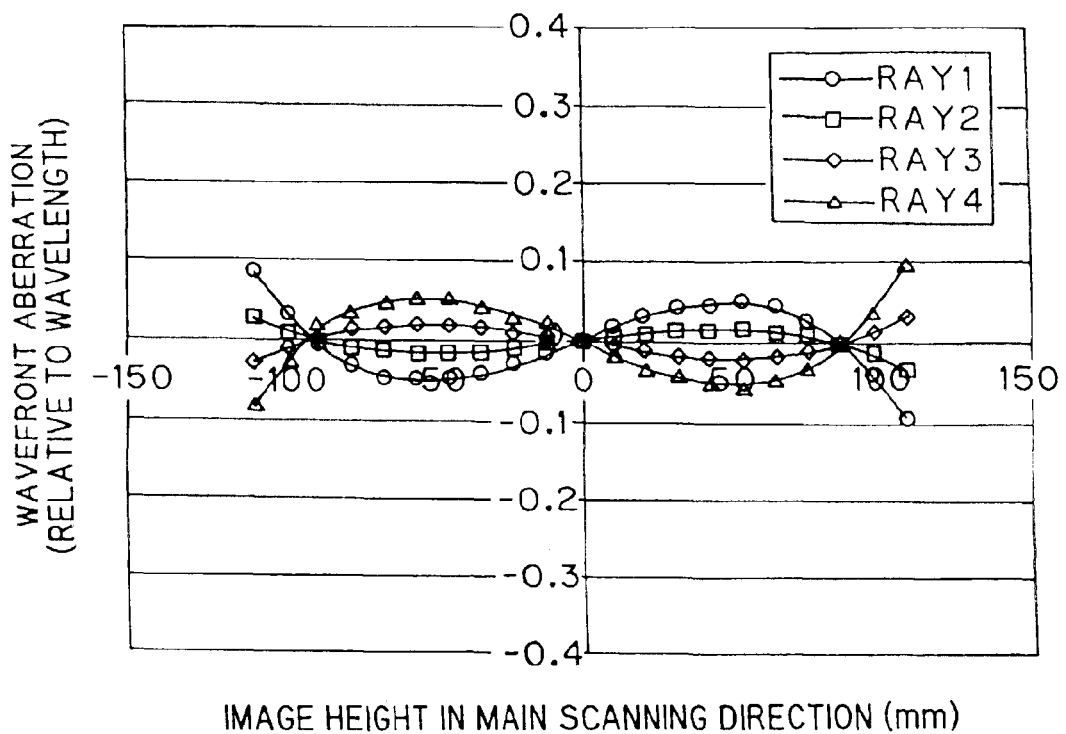
FIG. 10 is a graph showing the wavefront aberration observed in the first to fourth scanning optical systems shown in FIGS. 2A and 2B to 5A and 5B.

With respect to the imaging performance achieved in the first to fourth scanning optical systems (FIGS. 2A to 2B to 5A to 5B) described earlier, FIG. 9 shows the image height in the sub scanning direction, and FIG. 10 shows the wavefront aberration (relative to the wavelength) as observed therein. In FIGS. 9 and 10, rays 1 to 4 correspond to the laser beams LA to LD, respectively, and thus the lines representing them indicate the imaging performance of the first to fourth scanning optical systems, respectively, of the Practical Example 1. In FIG. 9, the variation of the image height (mm) in the sub scanning direction according to the image height (mm) in the main scanning direction is plotted as bow. Although, in reality, wavefront aberration is influenced not only by wavefront twist but also by coma, astigmatism, and other aberrations, FIG. 10 shows only the component corresponding to wavefront twist extracted therefrom. All values are given as P-V values (i.e., differences between the maximum and minimum values), with a positive or negative sign put thereto according to the direction of twist.

Figure 11:
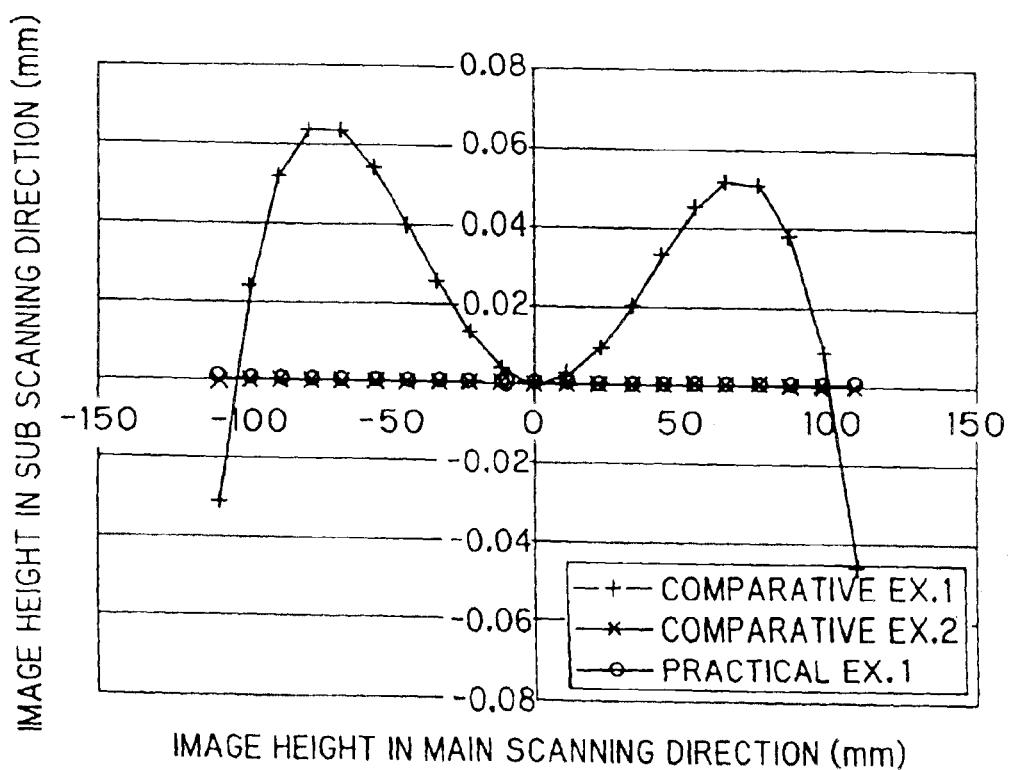
FIG. 11 is a graph showing the image height in the sub scanning direction observed in Comparative Examples 1 and 2.
Figure 12:
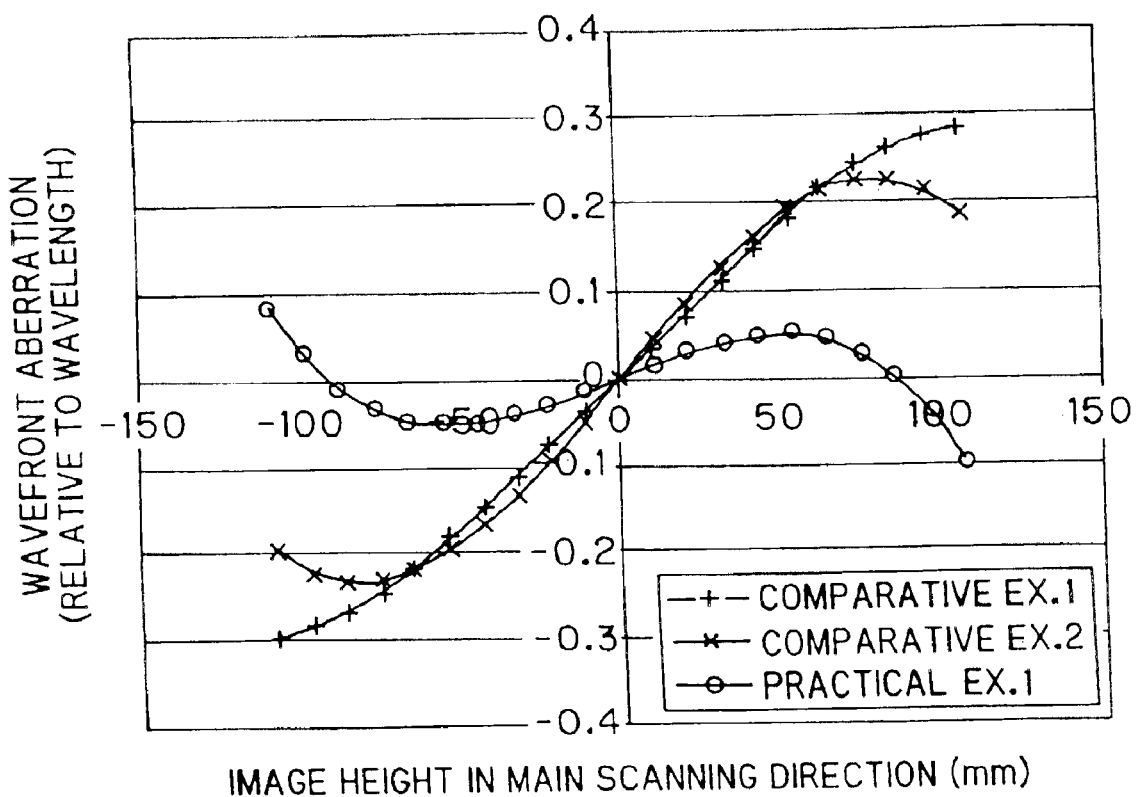
FIG. 12 is a graph showing the wavefront aberration observed in Comparative Examples 1 and 2.
Figure 13A:
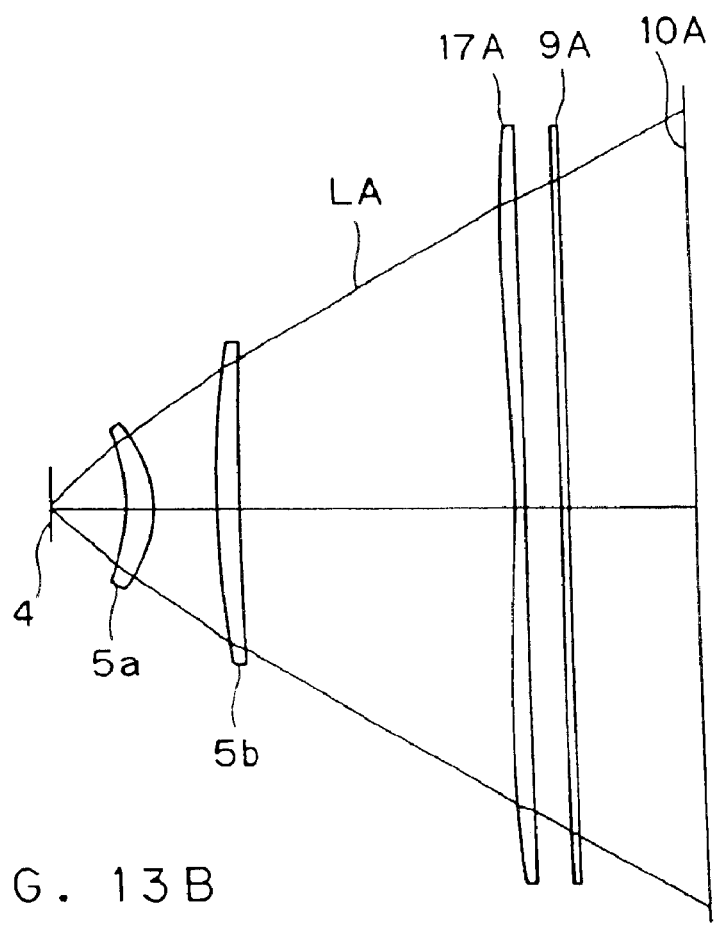
FIGS. 13A and 13B are optical construction diagrams showing the main and sub scanning sections, respectively, of a first scanning optical system used in another laser scanning apparatus (Practical Example 2) according to the invention.
Figure 13B:
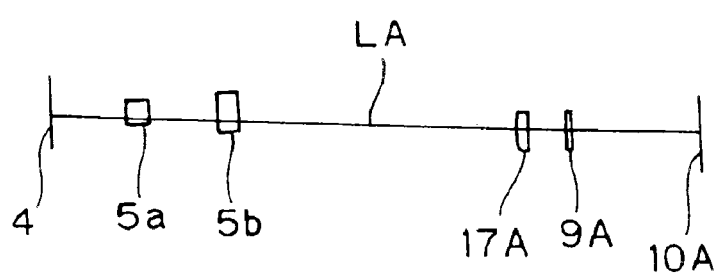
Figure 14A:
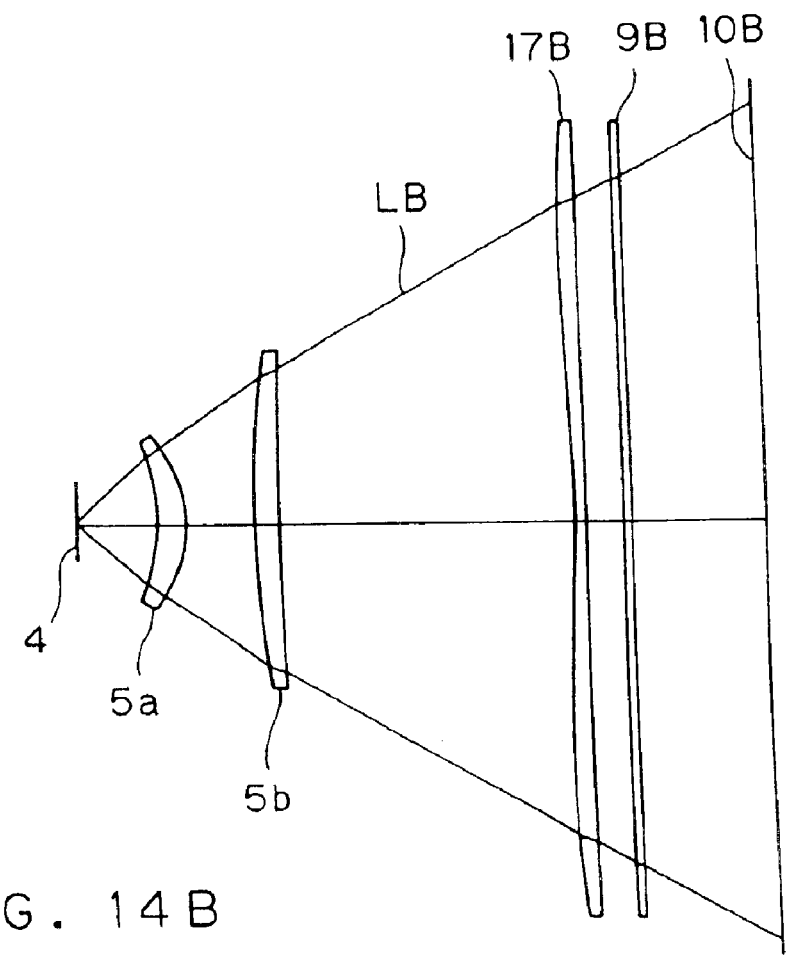
FIGS. 14A and 14B are optical construction diagrams showing the main and sub scanning sections, respectively, of a second scanning optical system used in the laser scanning apparatus of Practical Example 2.
Figure 14B:
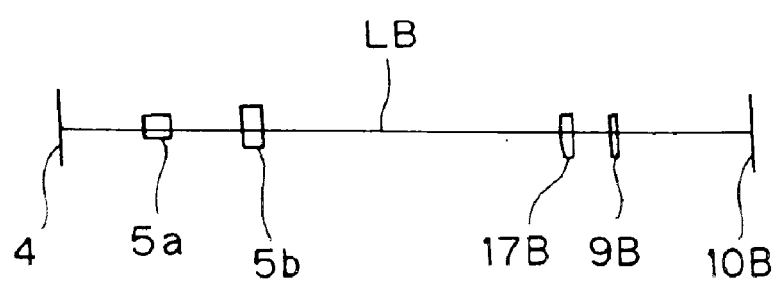
Figure 15A:
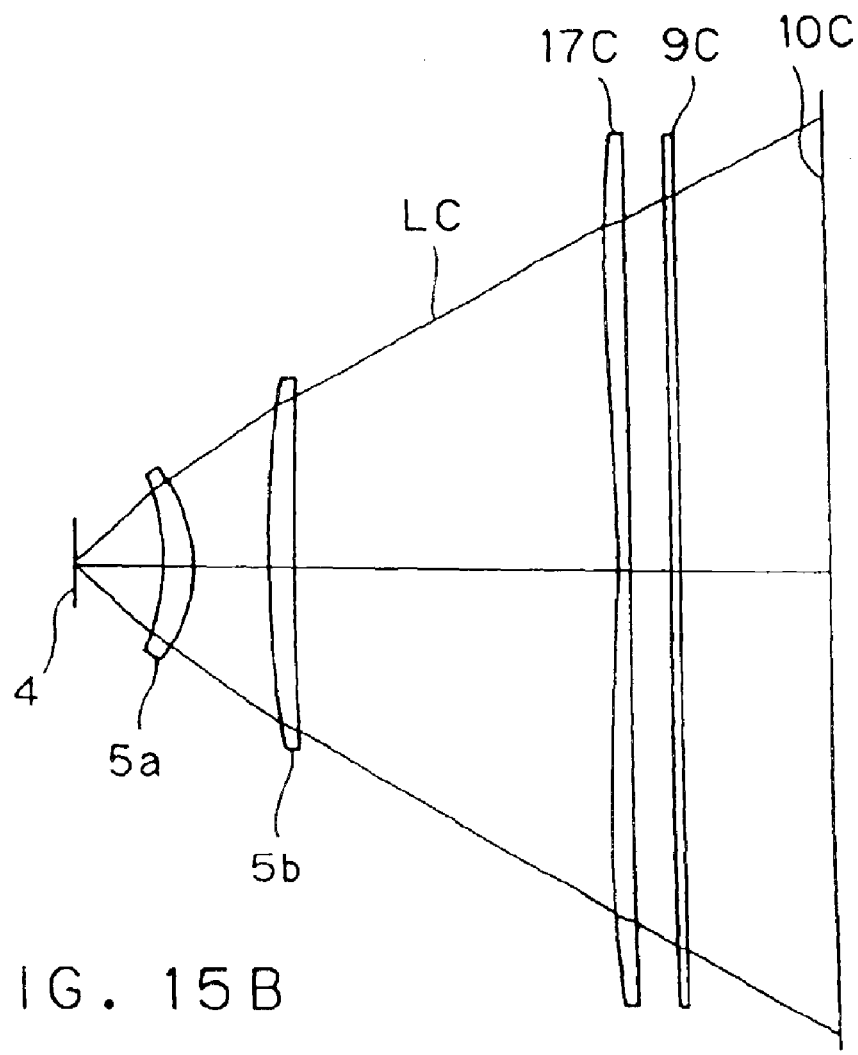
FIGS. 15A and 15B are optical construction diagrams showing the main and sub scanning sections, respectively, of a third scanning optical system used in the laser scanning apparatus of Practical Example 2.
Figure 15B:
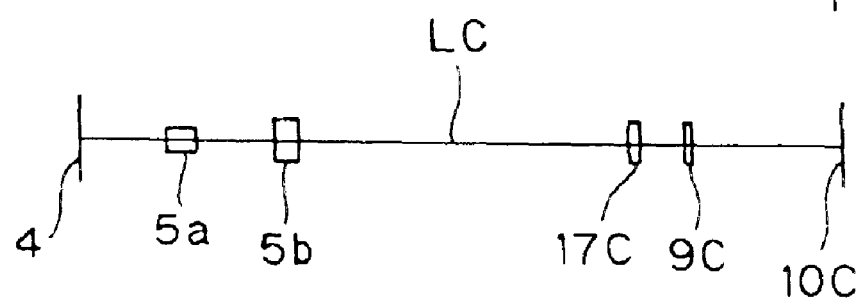
Figure 16A:
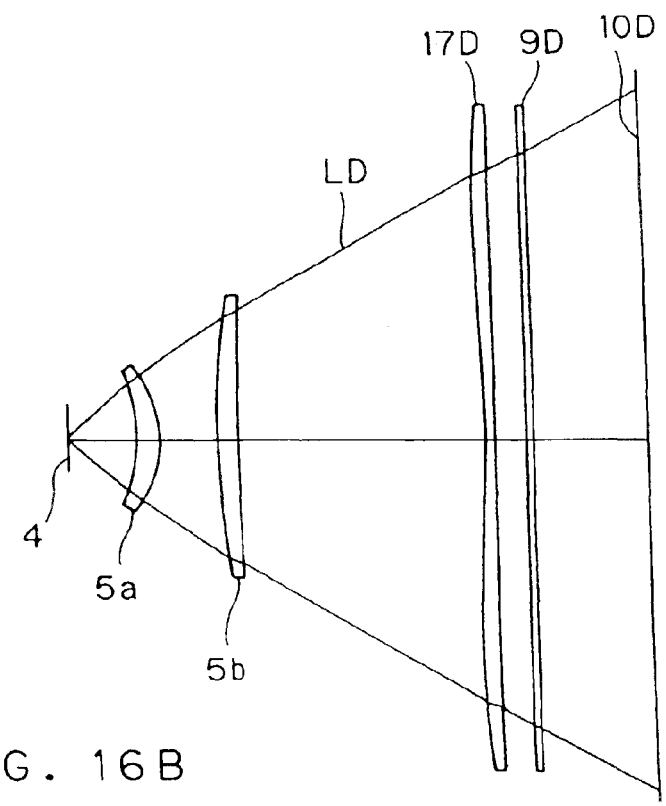
FIGS. 16A and 16B are optical construction diagrams showing the main and sub scanning sections, respectively, of a fourth scanning optical system used in the laser scanning apparatus of Practical Example 2.
Figure 16B:
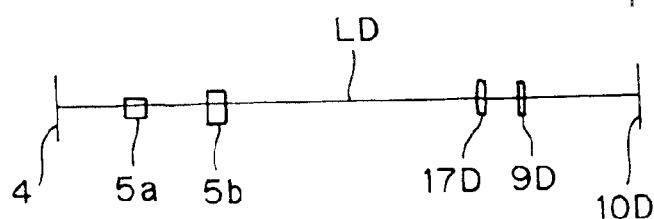

FIGS. 11 and 12 show the image height in the sub scanning direction and the wavefront aberration observed in Comparative Examples 1 and 2, in the same formats as FIGS. 9 and 10. In FIGS. 11 and 12, the line marked Practical Example 1 is that of ray 1 shown in FIGS. 9 and 10, and lines marked Comparative Examples 1 and 2 are those of the counterpart of ray 1 as observed therein. In Comparative Examples 1 and 2, the second lens 7A is so designed as not to change the angle of the laser beam in the sub scanning direction at the center of the screen. In Comparative Example 1, only the image surface is aligned without giving it a twist; in Comparative Example 2, not only is the image surface aligned, but also a twist is given thereto to correct bow. As will be understood from FIGS. 11 and 12, Comparative Example 1 suffers from large bow and wavefront twist, and Comparative Example 2, through satisfactory with respect to bow, suffers from as large wavefront twist as Comparative Example 1.

Next, another laser scanning apparatus embodying the invention will be described which is provided with a scanning optical system of a wide-angle type that includes two common lenses. An example (Practical Example 2) of the scanning optical system used in this laser scanning apparatus is presented in FIGS. 13A and 13B to 16A and 16B, which show the main scanning section (FIGS. 13A, 14A, 15A, and 16A) and sub scanning section (FIGS. 13B, 14B, 15B, and 16B) of the first to fourth scanning optical systems, respectively, of Practical Example 2, and in Tables 9 to 16, which show the construction data of the first to fourth scanning optical systems of Practical Example 2. It should be noted here, as with Practical Example 1 described earlier, that no data is given for a mirror surface having no curvature, and that the optical construction is presented in a state in which its optical path is straightened. Practical Example 2 has basically the same construction as Practical Example 1 described earlier, and differs therefrom in that it has two common lenses, namely the first and the second lens 5a and 5b. Thus, the third lenses 17A to 17D here are equivalent to the second lenses 7A to 7D of Practical Example 1, and, for example, two of the third lenses 17A to 17D here correspond to the first and second scanning lenses mentioned earlier.

Tables 9, 11, 13, and 15 show, out of the construction data of the first to fourth scanning optical systems, respectively, of Practical Example 2, the coordinates (mm) of the optical surfaces. These coordinates indicate the location of each optical surface (of which the vertex is used as its reference point), and are given as the coordinates of the origin and the vectors of the axes of a local rectangular coordinate system (x, y, and z) with respect to the global rectangular coordinate system (X, Y, and Z), as evaluated on the surface (evaluation surface) of the corresponding photoconductor (one of 10A to 10D). On the other hand, Tables 10, 12, 14, and 16 show the surface shapes of the optical surfaces constituting the first to fourth scanning optical systems, respectively, of Practical Example 2 (in these tables, "E-n" represents "×10$^{-n}$," and no data is given for an optical surface that is flat or for the evaluation surfaces). Here, all the surfaces for which their surface shape data $a_{ij}$ is shown are free-form surfaces, of which the surface shape is defined by formula (FS) noted earlier. It should be noted here that any coefficient $a_{ij}$ that does not appear in the tables equals 0, and that all the lenses used in the scanning optical systems are made of an optical material having a refractive index of 1.52440.

As Tables 9 to 16 show, since the first and second lenses 5a and 5b are common to the first to fourth scanning optical systems of Practical Example 2, they have the same coordinates and surface shapes in all those scanning optical systems. On the other hand, the third lenses 17A to 17D in the first to fourth scanning optical systems of Practical Example 2 have different coordinates and surface shapes from one another. Here, the second and fourth scanning optical systems (FIGS. 14 and 16, respectively) are so located as to have the relationship of an object and its mirror image.

In the first and second lenses 5a and 5b, the coefficient $a_{ij}$ in formula (FS) equals zero for all terms with j>0 on any of their surfaces, and thus formula (FS), which defines the surface shape, is reduced to a function of y alone. That is, determining the value of y alone results in determining the value of x irrespective of the value of z. This means that the first and second lenses 5a and 5b are composed of surfaces that have no inclination nor curvature in the sub scanning direction. In the third lenses 17A, 17B, and 17D of the first, second, and fourth scanning optical systems, the coefficient $a_{ij}$ does not always equal zero for terms with j=1. Thus, the entrance-side surface (surface number 5) of the third lenses 17A, 17B and 17D has an inclination in the sub scanning direction, and in addition the inclination varies according to the position in the main scanning direction. In the third lens 17C of the third scanning optical system, the coefficient $a_{ij}$ equals zero for all terms with j=0. Thus, the third lens 17C has no inclination at Z=0. In all the third lenses 17A to 17D of the first to fourth scanning optical systems, the coefficient $a_{ij}$ does not always equal zero for terms with j=2. Thus, the entrance-side surface (surface number 5) of the third lenses 17A to 17D has a curvature in the sub scanning direction, and in addition the curvature varies according to the position in the main scanning direction.

Figure 17:
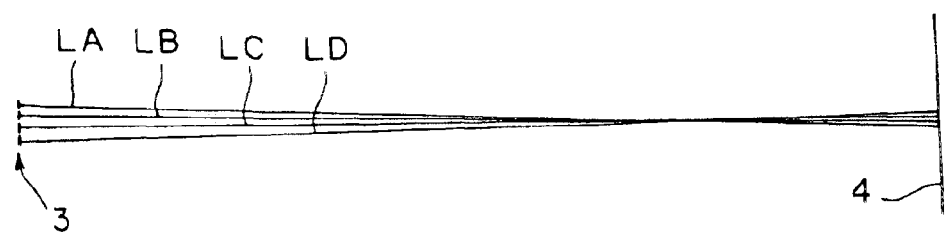
FIG. 17 is an optical path diagram showing the principal rays of the laser beams, as observed in the sub scanning section, that are incident on the polygon mirror in the laser scanning apparatus provided with the first to fourth scanning optical systems shown in FIGS. 13A and 13B to 16A and 16B.

FIG. 17, just like FIG. 6, shows the principal rays of the laser beams LA to LD, as observed in the sub scanning section, that are incident on the polygon mirror 4. The four laser beams LA to LD are incident on the polygon mirror 4 at different angles in the sub scanning direction, specifically at −2, −1, 0, and 1 degree, respectively. Moreover, the laser beams LA to LD cross one another before they are incident on the polygon mirror 4, and thus are incident thereon at different heights. Since the four laser beams LA to LD do not have to be incident on the deflecting-reflecting surface of the polygon mirror 4 at equal heights, by making the laser beams LA to LD cross one another before they are incident on the polygon mirror 4, they are made incident on the deflecting-reflecting surface at different heights. This helps overcome the difficulty in separating optical paths that increases as increasingly wide angles are sought for miniaturization.

In the first scanning optical system (FIGS. 13A and 13B), let the angle that the principal ray of the laser beam LA makes with the main scanning plane when it is incident on the polygon mirror 4 be α, let the angle that the principal ray of the laser beam LA makes with the main scanning plane when it exits from the third lens 17A at the deflection angle corresponding to the center of the image be α', and let the angle that the principal ray of the laser beam LA makes with the main scanning plane when it exits from the third lens 17A at the deflection angle corresponding to the end of the image be α". Then, α=−2.0, α'=−0.91, and α"=−0.046 (all in degrees). On the other hand, in the second scanning optical system (FIGS. 14A and 14B), let the angle that the principal ray of the laser beam LB makes with the main scanning plane when it is incident on the polygon mirror 4 be β, let the angle that the principal ray of the laser beam LB makes with the main scanning plane when it exits from the third lens 17B at the deflection angle corresponding to the center of the image be β', and let the angle that the principal ray of the laser beam LB makes with the main scanning plane when it exits from the third lens 177B at the deflection angle corresponding to the end of the image be β". Then, β=−1.0, β'=−0.50, and β"=−0.060 (all in degrees). Thus, (αβ')/(α'β)= 1.1, α"/α'=0.051, and β"/β'=0.12.

Figure 18:
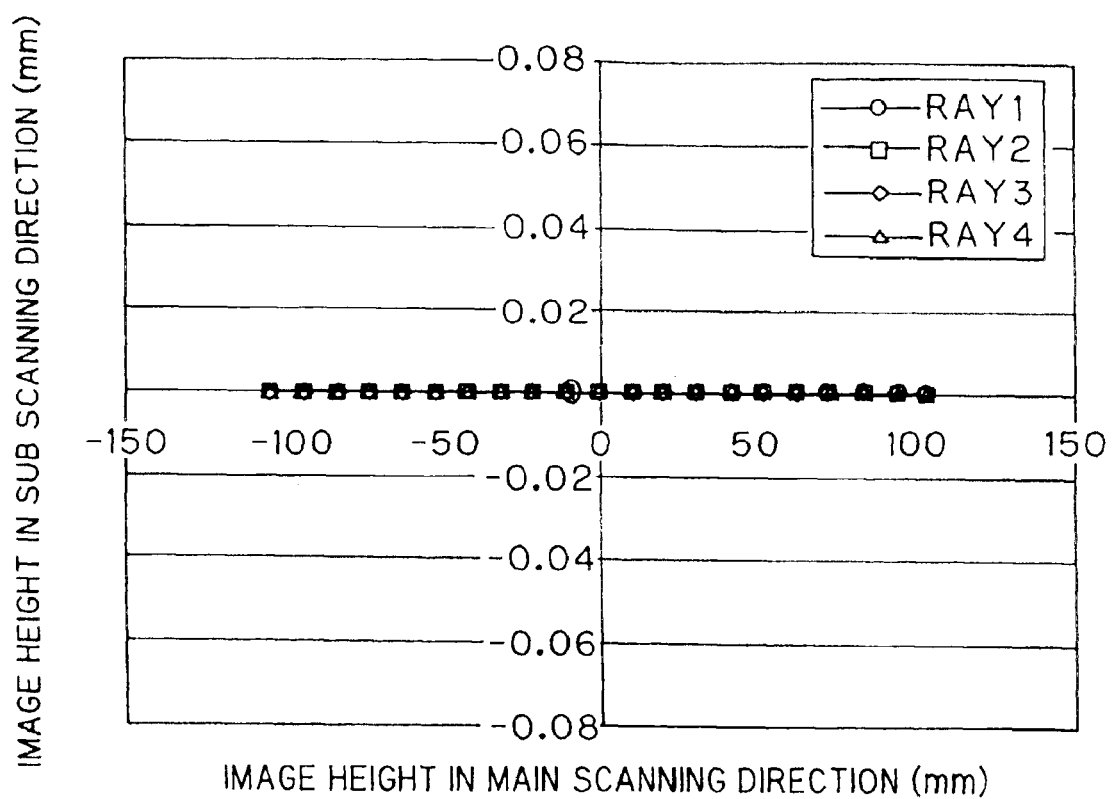
FIG. 18 is a graph showing the image height in the sub scanning direction observed in the first to fourth scanning optical systems shown in FIGS. 13A and 13B to 16A and 16B.
Figure 19:
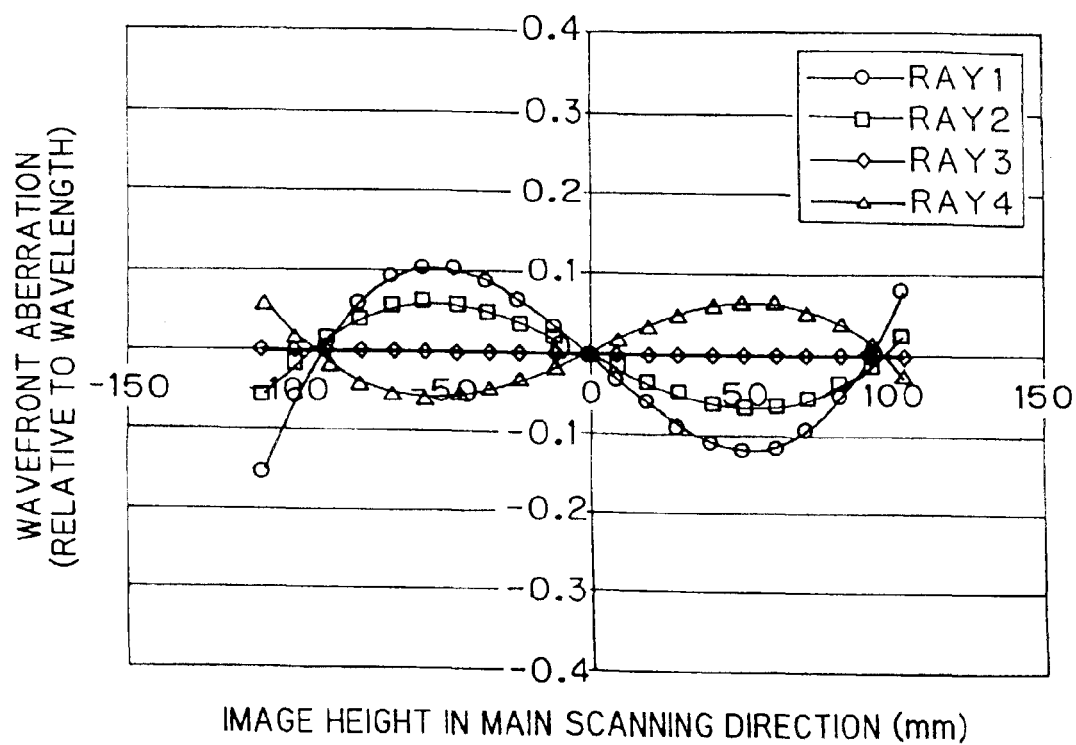
FIG. 19 is a graph showing the wavefront aberration observed in the first to fourth scanning optical systems shown in FIGS. 13A and 13B to 16A and 16B.

With respect to the imaging performance achieved in the first to fourth scanning optical systems (FIGS. 13A and 13B to 16A and 16B) described above, FIG. 18, like FIG. 9, shows the image height in the sub scanning direction, and FIG. 19, like FIG. 10, shows the wavefront aberration (relative to the wavelength) as observed therein. In FIGS. 18 and 19, rays 1 to 4 correspond to the laser beams LA to LD, respectively, and thus the lines representing them indicate the imaging performance of the first to fourth scanning optical systems, respectively, of the Practical Example 2. In FIG. 18, the variation of the image height (mm) in the sub scanning direction according to the image height (mm) in the main scanning direction is plotted as bow. Although, in reality, wavefront aberration is influenced not only by wavefront twist but also by coma, astigmatism, and other aberrations, FIG. 19 shows only the component corresponding to wavefront twist extracted therefrom. All values are given as P-V values, with a positive or negative sign put thereto according to the direction of twist.

As described above, according to the present invention, the first and second scanning lenses each have a surface having a different twist from each other. This makes it possible to give those lenses surfaces having the optimum degrees of twist to correct bow and wavefront twist according to the angles in the sub scanning direction at which the laser beams are incident on the deflector. This makes it possible to realize a tandem-type laser scanning apparatus that can form a high-precision color image fast with satisfactorily corrected bow and wavefront twist in all of a plurality of laser beams.

TABLE 1

Practical Example 1, First Scanning Optical System (FIGS. 2A and 2B)
Coordinates of Optical Surfaces

| Surface | Name | Local Coord. Origin | | | Local Coord. x-Axis Vector | | | Local Coord. y-Axis Vector | | |
|---|---|---|---|---|---|---|---|---|---|---|
| | | X | Y | Z | X | Y | Z | X | Y | X |
| 1 | First Lens 5 | 25 | 0 | 0 | 1 | 0 | 0 | 0 | 1 | 0 |
| 2 | | 31 | 0 | 0 | 1 | 0 | 0 | 0 | 1 | 0 |
| 3 | Second Lens 7A | 172 | 0 | 8.26 | 1 | 0 | 0 | 0 | 1 | 0 |
| 4 | | 176 | 0 | 8.26 | 1 | 0 | 0 | 0 | 1 | 0 |
| 5 | Window Glass | 195.4 | 0 | 8.26 | 0.9882 | 0 | −0.1535 | 0 | 1 | 0 |
| 6 | Plate 9A | 197.18 | 0 | 7.99 | 0.9882 | 0 | −0.1535 | 0 | 1 | 0 |
| 7 | Evaluation Surface 10A | 232.09 | 0 | 9.26 | 1 | 0 | 0 | 0 | 1 | 0 |

TABLE 2

Practical Example 1, First Scanning Optical System
(FIGS. 2A and 2B)
Shapes ($a_{ij}$) of Optical Surfaces

| Surface | i | j 0 | Surface | i | j 0 |
|---|---|---|---|---|---|

TABLE 2-continued

Practical Example 1, First Scanning Optical System
(FIGS. 2A and 2B)
Shapes ($a_{ij}$) of Optical Surfaces

| | | | | | |
|---|---|---|---|---|---|
| 1 | 1 | −1.20419E−3 | 2 | 2 | −1.10023E−2 |
| | 2 | −6.74959E−3 | | 4 | −6.67923E−7 |
| | 3 | 2.32814E−7 | | 6 | −1.09165E−9 |
| | 4 | 3.23691E−7 | | 8 | 2.87015E−13 |
| | 5 | −1.16249E−9 | | 10 | −4.59072E−16 |
| | 6 | −1.85999E−9 | | | |
| | 7 | 2.09821E−13 | | | |
| | 8 | 3.11671E−12 | | | |
| | 9 | 1.77907E−15 | | | |
| | 10 | −2.92642E−15 | | | |

| | | j | | |
|---|---|---|---|---|
| Surface | i | 0 | 1 | 2 |
| 3 | 0 | 0.00000 | 5.15900E−2 | 2.00820E−2 |
| | 1 | 0.00000 | −2.37669E−6 | 3.61280E−7 |
| | 2 | −8.01073E−4 | −2.88147E−7 | −5.68950E−7 |
| | 3 | 0.00000 | −9.38585E−11 | −9.04851E−11 |
| | 4 | 1.18900E−7 | −2.68589E−10 | 8.47159E−12 |
| | 5 | 0.00000 | 9.17697E−14 | 5.60997E−15 |
| | 6 | −4.49046E−12 | 2.96392E−14 | 3.22383E−15 |
| | 7 | 0.00000 | −1.59599E−17 | −8.81412E−20 |
| | 8 | 7.75746E−17 | −2.02338E−18 | −3.92108E−19 |
| | 9 | 0.00000 | 8.64146E−22 | −8.44136E−24 |
| | 10 | 1.40105E−21 | 6.63497E−23 | 1.64440E−23 |

TABLE 3

Practical Example 1, Second Scanning Optical System (FIGS. 3A and 3B)
Coordinates of Optical Surfaces

| | | Local Coord. Origin | | | Local Coord. x-Axis Vector | | | Local Coord. y-Axis Vector | | |
|---|---|---|---|---|---|---|---|---|---|---|
| Surface | Name | X | Y | Z | X | Y | Z | X | Y | Z |
| 1 | First Lens 5 | 25 | 0 | 0 | 1 | 0 | 0 | 0 | 1 | 0 |
| 2 | | 31 | 0 | 0 | 1 | 0 | 0 | 0 | 1 | 0 |
| 3 | Second Lens 7B | 172 | 0 | 2.75 | 1 | 0 | 0 | 0 | 1 | 0 |
| 4 | | 176 | 0 | 2.75 | 1 | 0 | 0 | 0 | 1 | 0 |
| 5 | Window Glass | 195.4 | 0 | 2.75 | 0.9861 | 0 | −0.1662 | 0 | 1 | 0 |
| 6 | Plate 9B | 197.17 | 0 | 2.45 | 0.9861 | 0 | −0.1662 | 0 | 1 | 0 |
| 7 | Evaluation Surface 10B | 232.32 | 0 | 3.06 | 1 | 0 | 0 | 0 | 1 | 0 |

TABLE 4

Practical Example 1, Second Scanning Optical System
(FIGS. 3A and 3B)
Shapes ($a_{ij}$) of Optical Surfaces

| | | j | | | j |
|---|---|---|---|---|---|
| Surface | i | 0 | Surface | i | 0 |
| 1 | 1 | −1.20419E−3 | 2 | 2 | −1.10023E−2 |
| | 2 | −6.74959E−3 | | 4 | −6.67923E−7 |
| | 3 | 2.32814E−7 | | 6 | −1.09165E−9 |
| | 4 | 3.23691E−7 | | 8 | 2.87015E−13 |
| | 5 | −1.16249E−9 | | 10 | −4.59072E−16 |

TABLE 4-continued

Practical Example 1, Second Scanning Optical System
(FIGS. 3A and 3B)
Shapes ($a_{ij}$) of Optical Surfaces

| | | | | | |
|---|---|---|---|---|---|
| | 6 | −1.85999E−9 | | | |
| | 7 | 2.09821E−13 | | | |
| | 8 | 3.11671E−12 | | | |
| | 9 | 1.77907E−15 | | | |
| | 10 | −2.92642E−15 | | | |

| | | j | | |
|---|---|---|---|---|
| Surface | i | 0 | 1 | 2 |
| 3 | 0 | 0.00000 | 1.59118E−2 | 2.01178E−2 |
| | 1 | 0.00000 | −8.18880E−7 | 3.54289E−7 |
| | 2 | −7.69758E−4 | −1.05552E−7 | −5.73799E−7 |
| | 3 | 0.00000 | 1.52490E−11 | −8.60217E−11 |
| | 4 | 1.18038E−7 | −9.98173E−11 | 1.45439E−11 |
| | 5 | 0.00000 | 1.21961E−14 | 5.10760E−15 |
| | 6 | −4.43314E−12 | 1.45057E−14 | 1.04131E−15 |
| | 7 | 0.00000 | −2.87942E−18 | −2.32440E−19 |
| | 8 | 6.96999E−17 | −1.32909E−18 | −9.49093E−20 |
| | 9 | 0.00000 | 1.94889E−22 | 8.90437E−24 |
| | 10 | 1.84362E−21 | 5.31036E−23 | 2.64745E−24 |

TABLE 5

Practical Example 1, Third Scanning Optical System (FIGS. 4A and 4B)
Coordinates of Optical Surfaces

| Surface | Name | Local Coord. Origin | | | Local Coord. x-Axis Vector | | | Local Coord. y-Axis Vector | | |
|---|---|---|---|---|---|---|---|---|---|---|
| | | X | Y | Z | X | Y | Z | X | Y | Z |
| 1 | First Lens 5 | 25 | 0 | 0 | 1 | 0 | 0 | 0 | 1 | 0 |
| 2 | | 31 | 0 | 0 | 1 | 0 | 0 | 0 | 1 | 0 |
| 3 | Second Lens 7C | 172 | 0 | −2.75 | 1 | 0 | 0 | 0 | 1 | 0 |
| 4 | | 176 | 0 | −2.75 | 1 | 0 | 0 | 0 | 1 | 0 |
| 5 | Window Glass | 195.4 | 0 | −2.75 | 0.9838 | 0 | −0.1791 | 0 | 1 | 0 |
| 6 | Plate 9C | 197.17 | 0 | −3.07 | 0.9838 | 0 | −0.1791 | 0 | 1 | 0 |
| 7 | Evaluation Surface 10C | 232.31 | 0 | −3.16 | 1 | 0 | 0 | 0 | 1 | 0 |

TABLE 6

Practical Example 1, Third Scanning Optical System (FIGS. 4A and 4B)
Shapes ($a_{ij}$) of Optical Surfaces

| Surface | i | j=0 | Surface | i | j=0 |
|---|---|---|---|---|---|
| 1 | 1 | −1.20419E−3 | 2 | 2 | −1.10023E−2 |
| | 2 | −6.74959E−3 | | 4 | −6.67923E−7 |
| | 3 | 2.32814E−7 | | 6 | −1.09165E−9 |
| | 4 | 3.23691E−7 | | 8 | 2.87015E−13 |
| | 5 | −1.16249E−9 | | 10 | −4.59072E−16 |
| | 6 | −1.85999E−9 | | | |
| | 7 | 2.09821E−13 | | | |
| | 8 | 3.11671E−12 | | | |
| | 9 | 1.77907E−15 | | | |
| | 10 | −2.92642E−15 | | | |

| Surface | i | j=0 | j=1 | j=2 |
|---|---|---|---|---|
| 3 | 0 | 0.00000 | −1.94180E−2 | 2.01177E−2 |
| | 1 | 0.00000 | 8.43054E−7 | 3.48157E−7 |
| | 2 | −7.69900E−4 | 8.62121E−8 | −5.72187E−7 |
| | 3 | 0.00000 | 1.45968E−12 | −7.48159E−11 |
| | 4 | 1.18040E−7 | 9.64190E−11 | 1.30284E−11 |
| | 5 | 0.00000 | −2.19310E−14 | 1.54198E−17 |
| | 6 | −4.43322E−12 | −1.08409E−14 | 1.55852E−15 |
| | 7 | 0.00000 | 4.11489E−18 | 6.05454E−19 |
| | 8 | 6.97237E−17 | 7.55889E−19 | −1.63540E−19 |
| | 9 | 0.00000 | −2.27505E−22 | −3.63054E−23 |
| | 10 | 1.84262E−21 | −2.51937E−23 | 5.73137E−24 |

TABLE 7

Practical Example 1, Fourth Scanning Optical System (FIGS. 5A and 5B)
Coordinates of Optical Surfaces

| Surface | Name | Local Coord. Origin | | | Local Coord. x-Axis Vector | | | Local Coord. y-Axis Vector | | |
|---|---|---|---|---|---|---|---|---|---|---|
| | | X | Y | Z | X | Y | Z | X | Y | Z |
| 1 | First Lens 5 | 25 | 0 | 0 | 1 | 0 | 0 | 0 | 1 | 0 |
| 2 | | 31 | 0 | 0 | 1 | 0 | 0 | 0 | 1 | 0 |
| 3 | Second Lens 7D | 172 | 0 | −8.26 | 1 | 0 | 0 | 0 | 1 | 0 |
| 4 | | 176 | 0 | −8.26 | 1 | 0 | 0 | 0 | 1 | 0 |
| 5 | Window Glass | 195.4 | 0 | −8.26 | 0.9814 | 0 | −0.1918 | 0 | 1 | 0 |
| 6 | Plate 9D | 197.17 | 0 | −8.61 | 0.9814 | 0 | −0.1918 | 0 | 1 | 0 |
| 7 | Evaluation Surface 10D | 232.09 | 0 | −9.36 | 1 | 0 | 0 | 0 | 1 | 0 |

TABLE 8

Practical Example 1, Fourth Scanning Optical System (FIGS. 5A and 5B)
Shapes ($a_{ij}$) of Optical Surfaces

| Surface | i | j=0 | Surface | i | j=0 |
|---|---|---|---|---|---|
| 1 | 1 | −1.20419E−3 | 2 | 2 | −1.10023E−2 |
| | 2 | −6.74959E−3 | | 4 | −6.67923E−7 |
| | 3 | 2.32814E−7 | | 6 | −1.09165E−9 |
| | 4 | 3.23691E−7 | | 8 | 2.87015E−13 |
| | 5 | −1.16249E−9 | | 10 | −4.59072E−16 |
| | 6 | −1.85999E−9 | | | |
| | 7 | 2.09821E−13 | | | |
| | 8 | 3.11671E−12 | | | |
| | 9 | 1.77907E−15 | | | |
| | 10 | −2.92642E−15 | | | |

| Surface | i | j=0 | j=1 | j=2 |
|---|---|---|---|---|
| 3 | 0 | 0.00000 | −5.49837E−2 | 2.00816E−2 |
| | 1 | 0.00000 | 2.47374E−6 | 3.64889E−7 |
| | 2 | −8.01237E−4 | 2.57241E−7 | −5.70884E−7 |
| | 3 | 0.00000 | 2.19497E−11 | −9.41611E−11 |
| | 4 | 1.19125E−7 | 2.72956E−10 | 1.05026E−11 |
| | 5 | 0.00000 | −7.10652E−14 | 6.91773E−15 |
| | 6 | −4.55803E−12 | −2.84611E−14 | 2.65234E−15 |
| | 7 | 0.00000 | 1.34487E−17 | −2.50291E−19 |
| | 8 | 8.49047E−17 | 1.77921E−18 | −3.25538E−19 |
| | 9 | 0.00000 | −7.56607E−22 | −2.24383E−24 |
| | 10 | 1.14197E−21 | −5.37679E−23 | 1.37155E−23 |

TABLE 9

Practical Example 2, First Scanning Optical System
(FIGS. 13A and 13B) Coordinates of Optical Surfaces

| Surface | Name | Local Coord. Origin | | | Local Coord. x-Axis Vector | | | Local Coord. y-Axis Vector | | |
|---|---|---|---|---|---|---|---|---|---|---|
| | | X | Y | Z | X | Y | Z | X | Y | Z |
| 1 | First Lens | 20 | 0 | 0 | 1 | 0 | 0 | 0 | 1 | 0 |
| 2 | 5a | 27 | 0 | 0 | 1 | 0 | 0 | 0 | 1 | 0 |
| 3 | Second Lens | 45 | 0 | 0.00 | 1 | 0 | 0 | 0 | 1 | 0 |
| 4 | 5b | 51 | 0 | 0.00 | 1 | 0 | 0 | 0 | 1 | 0 |
| 5 | Third Lens | 126.96 | 0 | −5.67 | 1 | 0 | 0 | 0 | 1 | 0 |
| 6 | 17A | 129.96 | 0 | −5.67 | 1 | 0 | 0 | 0 | 1 | 0 |
| 7 | Window | 139.96 | 0 | −5.67 | 1 | 0 | 0 | 0 | 1 | 0 |
| 8 | Glass Plate 9A | 141.96 | 0 | −5.67 | 1 | 0 | 0 | 0 | 1 | 0 |
| 9 | Evaluation Surface 10A | 176.96 | 0 | −5.95 | 1 | 0 | 0 | 0 | 1 | 0 |

TABLE 10

Practical Example 2, First Scanning Optical System
(FIGS. 13A and 13B)
Shapes ($a_{ij}$) of Optical Surfaces

| Surface | i | j=0 | Surface | i | j=0 | Surface | i | j=0 |
|---|---|---|---|---|---|---|---|---|
| 1 | 1 | 1.06418E−2 | 2 | 1 | −2.64818E−3 | 3 | 1 | 1.56433E−3 |
| | 2 | −9.82428E−3 | | 2 | −1.53400E−2 | | 2 | 1.83014E−3 |
| | 3 | 6.33481E−6 | | 3 | −1.39591E−6 | | 3 | −1.49422E−6 |
| | 4 | −1.49278E−6 | | 4 | −3.26764E−6 | | 4 | −8.87569E−8 |
| | 5 | −5.29856E−9 | | 5 | −6.63082E−9 | | 5 | 3.34543E−10 |
| | 6 | −9.27033E−11 | | 6 | −1.41875E−9 | | 6 | 4.46854E−11 |
| | 7 | 1.52657E−11 | | 7 | 1.60368E−12 | | 7 | 8.61690E−15 |
| | 8 | −1.93300E−12 | | 8 | −8.91885E−13 | | 8 | −9.55463E−15 |
| | 9 | −1.52780E−14 | | 9 | −8.69048E−16 | | 9 | −7.02575E−18 |
| | 10 | 1.89717E−15 | | 10 | −1.14931E−15 | | 10 | 7.29918E−19 |

| Surface | i | j=0 | Surface | i | j=0 | j=1 | j=2 |
|---|---|---|---|---|---|---|---|
| 4 | 2 | 8.50629E−4 | 5 | 0 | 0.00000 | −6.27518E−2 | 2.73670E−2 |
| | 4 | −1.89017E−7 | | 1 | 0.00000 | −1.81041E−6 | −2.35784E−6 |
| | 6 | −8.09960E−12 | | 2 | −1.17714E−3 | 1.46976E−6 | −1.37365E−6 |
| | 8 | 9.55240E−15 | | 3 | 0.00000 | 1.50081E−10 | 7.39978E−10 |
| | 10 | −1.52714E−18 | | 4 | 2.58181E−7 | 4.46822E−10 | 6.58371E−11 |
| | | | | 5 | 0.00000 | −9.12832E−14 | −5.68973E−14 |
| | | | | 6 | −2.20284E−11 | −6.75420E−14 | 1.68200E−15 |
| | | | | 7 | 0.00000 | 7.63697E−18 | 1.99598E−18 |
| | | | | 8 | 1.05121E−15 | 3.00382E−18 | −1.85472E−19 |
| | | | | 9 | 0.00000 | 0.00000 | 0.00000 |
| | | | | 10 | −2.53041E−20 | 0.00000 | 0.00000 |

TABLE 11

Practical Example 2, Second Scanning Optical System
(FIGS. 14A and 14B) Coordinates of Optical Surfaces

| Surface | Name | Local Coord. Origin | | | Local Coord. x-Axis Vector | | | Local Coord. y-Axis Vector | | |
|---|---|---|---|---|---|---|---|---|---|---|
| | | X | Y | Z | X | Y | Z | X | Y | Z |
| 1 | First Lens 5a | 20 | 0 | 0 | 1 | 0 | 0 | 0 | 1 | 0 |
| 2 | | 27 | 0 | 0 | 1 | 0 | 0 | 0 | 1 | 0 |
| 3 | Second Lens | 45 | 0 | 0 | 1 | 0 | 0 | 0 | 1 | 0 |
| 4 | 5b | 51 | 0 | 0 | 1 | 0 | 0 | 0 | 1 | 0 |

TABLE 11-continued

Practical Example 2, Second Scanning Optical System
(FIGS. 14A and 14B) Coordinates of Optical Surfaces

| Surface | Name | Local Coord. Origin | | | Local Coord. x-Axis Vector | | | Local Coord. y-Axis Vector | | |
|---|---|---|---|---|---|---|---|---|---|---|
| | | X | Y | Z | X | Y | Z | X | Y | Z |
| 5 | Third Lens | 126.94 | 0 | −2.83 | 1 | 0 | 0 | 0 | 1 | 0 |
| 6 | 17B | 129.94 | 0 | −2.83 | 1 | 0 | 0 | 0 | 1 | 0 |
| 7 | Window | 139.94 | 0 | −2.83 | 1 | 0 | 0 | 0 | 1 | 0 |
| 8 | Glass Plate 9B | 141.94 | 0 | −2.83 | 1 | 0 | 0 | 0 | 1 | 0 |
| 9 | Evaluation Surface 10B | 176.94 | 0 | −3.01 | 1 | 0 | 0 | 0 | 1 | 0 |

TABLE 12

Practical Example 2, Second Scanning Optical System
(FIGS. 14A and 14B)
Shapes ($a_{ij}$) of Optical Surfaces

| Surface | i | j=0 | Surface | i | j=0 | Surface | i | j=0 |
|---|---|---|---|---|---|---|---|---|
| 1 | 1 | 1.06418E−2 | 2 | 1 | −2.64818E−3 | 3 | 1 | 1.56433E−3 |
|   | 2 | −9.82428E−3 |   | 2 | −1.53400E−2 |   | 2 | 1.83014E−3 |
|   | 3 | 6.33481E−6 |   | 3 | −1.39591E−6 |   | 3 | −1.49422E−6 |
|   | 4 | −1.49278E−6 |   | 4 | −3.26764E−6 |   | 4 | −8.87569E−8 |
|   | 5 | −5.29856E−9 |   | 5 | −6.63082E−9 |   | 5 | 3.34543E−10 |
|   | 6 | −9.27033E−11 |   | 6 | −1.41875E−9 |   | 6 | 4.46854E−11 |
|   | 7 | 1.52657E−11 |   | 7 | 1.60368E−12 |   | 7 | 8.61690E−15 |
|   | 8 | −1.93300E−12 |   | 8 | −8.91885E−13 |   | 8 | −9.55463E−15 |
|   | 9 | −1.52780E−14 |   | 9 | −8.69048E−16 |   | 9 | −7.02575E−18 |
|   | 10 | 1.89717E−15 |   | 10 | −1.14931E−15 |   | 10 | 7.29918E−19 |

| Surface | i | j=0 | Surface | i | j=0 | j=1 | j=2 |
|---|---|---|---|---|---|---|---|
| 4 | 2 | 8.50629E−4 | 5 | 0 | 0.00000 | −3.00194E−2 | 2.74323E−2 |
|   | 4 | −1.89017E−7 |   | 1 | 0.00000 | −1.08401E−6 | −2.36568E−6 |
|   | 6 | −8.09960E−12 |   | 2 | −1.17451E−3 | 6.57039E−7 | −1.36991E−6 |
|   | 8 | 9.55240E−15 |   | 3 | 0.00000 | 1.30848E−10 | 7.41725E−10 |
|   | 10 | −1.52714E−18 |   | 4 | 2.58177E−7 | 2.30400E−10 | 6.05611E−11 |
|   |   |   |   | 5 | 0.00000 | −5.14832E−14 | −5.59726E−14 |
|   |   |   |   | 6 | −2.21862E−11 | −3.39671E−14 | 2.70733E−15 |
|   |   |   |   | 7 | 0.00000 | 4.11118E−18 | 1.86797E−18 |
|   |   |   |   | 8 | 1.07834E−15 | 1.49587E−18 | −2.48633E−19 |
|   |   |   |   | 9 | 0.00000 | 0.00000 | 0.00000 |
|   |   |   |   | 10 | −2.66977E−20 | 0.00000 | 0.00000 |

TABLE 13

Practical Example 2, Third Scanning Optical System
(FIGS. 15A and 15B) Coordinates of Optical Surfaces

| Surface | Name | Local Coord. Origin | | | Local Coord. x-Axis Vector | | | Local Coord. y-Axis Vector | | |
|---|---|---|---|---|---|---|---|---|---|---|
| | | X | Y | Z | X | Y | Z | X | Y | Z |
| 1 | First Lens 5a | 20 | 0 | 0 | 1 | 0 | 0 | 0 | 1 | 0 |
| 2 |  | 27 | 0 | 0 | 1 | 0 | 0 | 0 | 1 | 0 |
| 3 | Second Lens | 45 | 0 | 0 | 1 | 0 | 0 | 0 | 1 | 0 |
| 4 | 5b | 51 | 0 | 0 | 1 | 0 | 0 | 0 | 1 | 0 |
| 5 | Third Lens 17C | 126.93 | 0 | 0 | 1 | 0 | 0 | 0 | 1 | 0 |
| 6 |  | 129.93 | 0 | 0 | 1 | 0 | 0 | 0 | 1 | 0 |
| 7 | Window Glass | 139.93 | 0 | 0 | 1 | 0 | 0 | 0 | 1 | 0 |
| 8 | Plate 9C | 141.93 | 0 | 0 | 1 | 0 | 0 | 0 | 1 | 0 |
| 9 | Evaluation Surface 10C | 176.93 | 0 | 0 | 1 | 0 | 0 | 0 | 1 | 0 |

TABLE 14

Practical Example 2, Third Scanning Optical System
(FIGS. 15A and 15B)
Shapes ($a_{ij}$) of Optical Surfaces

| Surface | i | j=0 | Surface | i | j=0 | Surface | i | j=0 |
|---|---|---|---|---|---|---|---|---|
| 1 | 1 | 1.06418E−2 | 2 | 1 | −2.64818E−3 | 3 | 1 | 1.56433E−3 |
|   | 2 | −9.82428E−3 |   | 2 | −1.53400E−2 |   | 2 | 1.83014E−3 |
|   | 3 | 6.33481E−6 |   | 3 | −1.39591E−6 |   | 3 | −1.49422E−6 |

TABLE 14-continued

Practical Example 2, Third Scanning Optical System
(FIGS. 15A and 15B)
Shapes ($a_{ij}$) of Optical Surfaces

| | | | | | |
|---|---|---|---|---|---|
| 4 | −1.49278E−6 | 4 | −3.26764E−6 | 4 | −8.87569E−8 |
| 5 | −5.29856E−9 | 5 | −6.63082E−9 | 5 | 3.34543E−10 |
| 6 | −9.27033E−11 | 6 | −1.41875E−9 | 6 | 4.46854E−11 |
| 7 | 1.52657E−11 | 7 | 1.60368E−12 | 7 | 8.61690E−15 |
| 8 | −1.93300E−12 | 8 | −8.91885E−13 | 8 | −9.55463E−15 |
| 9 | −1.52780E−14 | 9 | −8.69048E−16 | 9 | −7.02575E−18 |
| 10 | 1.89717E−15 | 10 | −1.14931E−15 | 10 | 7.29918E−19 |

| Surface | i | j=0 | Surface | i | j=0 | j=2 |
|---|---|---|---|---|---|---|
| 4 | 2 | 8.50629E−4 | 5 | 0 | 0.00000 | 2.74537E−2 |
|   | 4 | −1.89017E−7 |   | 1 | 0.00000 | −2.37030E−6 |
|   | 6 | −8.09960E−12 |   | 2 | −1.17369E−3 | −1.36815E−6 |
|   | 8 | 9.55240E−15 |   | 3 | 0.00000 | 7.44092E−10 |
|   | 10 | −1.52714E−18 |   | 4 | 2.58183E−7 | 5.85965E−11 |
|   |   |   |   | 5 | 0.00000 | −5.60850E−14 |
|   |   |   |   | 6 | −2.22395E−11 | 3.08626E−15 |
|   |   |   |   | 7 | 0.00000 | 1.85318E−18 |
|   |   |   |   | 8 | 1.08747E−15 | −2.71884E−19 |
|   |   |   |   | 10 | −2.71660E−20 | 0.00000 |

TABLE 15

Practical Example 2, Fourth Scanning Optical System
(FIGS. 16A and 16B) Coordinates of Optical Surfaces

| | | Local Coord. Origin | | | Local Coord. x-Axis Vector | | | Local Coord. y-Axis Vector | | |
|---|---|---|---|---|---|---|---|---|---|---|
| Surface | Name | X | Y | Z | X | Y | Z | X | Y | Z |
| 1 | First Lens | 20 | 0 | 0 | 1 | 0 | 0 | 0 | 1 | 0 |
| 2 | 5a | 27 | 0 | 0 | 1 | 0 | 0 | 0 | 1 | 0 |
| 3 | Second Lens | 45 | 0 | 0 | 1 | 0 | 0 | 0 | 1 | 0 |
| 4 | 5b | 51 | 0 | 0 | 1 | 0 | 0 | 0 | 1 | 0 |
| 5 | Third Lens | 126.94 | 0 | 2.83 | 1 | 0 | 0 | 0 | 1 | 0 |
| 6 | 17D | 129.94 | 0 | 2.83 | 1 | 0 | 0 | 0 | 1 | 0 |
| 7 | Window | 139.94 | 0 | 2.83 | 1 | 0 | 0 | 0 | 1 | 0 |
| 8 | Glass Plate 9D | 141.94 | 0 | 2.83 | 1 | 0 | 0 | 0 | 1 | 0 |
| 9 | Evaluation Surface 10D | 176.94 | 0 | 3.01 | 1 | 0 | 0 | 0 | 1 | 0 |

TABLE 16

Practical Example 2, Fourth Scanning Optical System
(FIGS. 16A and 16B)
Shapes ($a_{ij}$) of Optical Surfaces

| Surface | i | j=0 | Surface | i | j=0 | Surface | i | j=0 |
|---|---|---|---|---|---|---|---|---|
| 1 | 1 | 1.06418E−2 | 2 | 1 | −2.64818E−3 | 3 | 1 | 1.56433E−3 |
|   | 2 | −9.82428E−3 |   | 2 | −1.53400E−2 |   | 2 | 1.83014E−3 |
|   | 3 | 6.33481E−6 |   | 3 | −1.39591E−6 |   | 3 | −1.49422E−6 |
|   | 4 | −1.49278E−6 |   | 4 | −3.26764E−6 |   | 4 | −8.87569E−8 |
|   | 5 | −5.29856E−9 |   | 5 | −6.63082E−9 |   | 5 | 3.34543E−10 |
|   | 6 | −9.27033E−11 |   | 6 | −1.41875E−9 |   | 6 | 4.46854E−11 |
|   | 7 | 1.52657E−11 |   | 7 | 1.60368E−12 |   | 7 | 8.61690E−15 |
|   | 8 | −1.93300E−12 |   | 8 | −8.91885E−13 |   | 8 | −9.55463E−15 |
|   | 9 | −1.52780E−14 |   | 9 | −8.69048E−16 |   | 9 | −7.02575E−18 |
|   | 10 | 1.89717E−15 |   | 10 | −1.14931E−15 |   | 10 | 7.29918E−19 |

TABLE 16-continued

Practical Example 2, Fourth Scanning Optical System
(FIGS. 16A and 16B)
Shapes ($a_{ij}$) of Optical Surfaces

| Surface | i | j=0 | Surface | i | j=0 | j=1 | j=2 |
|---|---|---|---|---|---|---|---|
| 4 | 2 | 8.50629E−4 | 5 | 0 | 0.00000 | 3.00194E−2 | 2.74323E−2 |
|   | 4 | −1.89017E−7 |   | 1 | 0.00000 | 1.08401E−6 | −2.36568E−6 |
|   | 6 | −8.09960E−12 |   | 2 | −1.17451E−3 | −6.57039E−7 | −1.36991E−6 |
|   | 8 | 9.55240E−15 |   | 3 | 0.00000 | −1.30848E−10 | 7.41725E−10 |
|   | 10 | −1.52714E−18 |   | 4 | 2.58177E−7 | −2.30400E−10 | 6.05611E−11 |
|   |   |   |   | 5 | 0.00000 | 5.14832E−14 | −5.59726E−14 |
|   |   |   |   | 6 | −2.21862E−11 | 3.39671E−14 | 2.70733E−15 |
|   |   |   |   | 7 | 0.00000 | −4.11118E−18 | 1.86797E−18 |
|   |   |   |   | 8 | 1.07834E−15 | −1.49587E−18 | −2.48633E−19 |
|   |   |   |   | 9 | 0.00000 | 0.00000 | 0.00000 |
|   |   |   |   | 10 | −2.66977E−20 | 0.00000 | 0.00000 |

What is claimed is:

1. A tandem-type laser scanning apparatus comprising:
a deflector for deflecting a first laser beam and a second laser beam in a main scanning direction by reflecting the laser beams simultaneously with a single surface, the first and second laser beams fulfilling the following conditions:

$$|\alpha| \neq |\beta|$$

$$\alpha \neq 0$$

$$\beta \neq 0$$

where $\alpha$ represents an angle that a principal ray of the first laser beam makes with a main scanning plane when the first laser beam is incident on the deflector; and $\beta$ represents an angle that a principal ray of the second laser beam makes with the main scanning plane when the second laser beam is incident on the deflector; and a scanning optical system for directing the deflected first and second laser beams to separate scanned surfaces corresponding thereto in such a way that the scanned surfaces are individually scanned with the laser beams focused thereon;

wherein the scanning optical system includes:
 a common lens that has no curvature in a sub scanning direction and that transmits both the first and second laser beams;
 a first scanning lens that transmits, of the first and second laser beams transmitted through the common lens, the first laser beam but not the second laser beam; and
 a second scanning lens that transmits, of the first and second laser beams transmitted through the common lens, the second laser beam but not the first laser beam,
 the first and second scanning lenses each having a surface having a different twist from each other.

2. A laser scanning apparatus as claimed in claim 1, wherein the following condition is fulfilled:

$$\alpha - \alpha' \neq \beta - \beta'$$

where, assuming that no bending of an optical path by a reflective surface having no curvature occurs in the scanning optical system, $\alpha'$ represents an angle that the principal ray of the first laser beam makes with the main scanning plane when the first laser beam exits from the first scanning lens at a deflection angle corresponding to a center of an image; and $\beta'$ represents an angle that the principal ray of the second laser beam makes with the main scanning plane when the second laser beam exits from the second scanning lens at the deflection angle corresponding to the center of the image.

3. A laser scanning apparatus as claimed in claim 1, wherein the following condition is fulfilled:

$$0.8 < (\alpha \beta')/(\alpha' \beta) < 1.25$$

where, assuming that no bending of an optical path by a reflective surface having no curvature occurs in the scanning optical system, $\alpha'$ represents an angle that the principal ray of the first laser beam makes with the main scanning plane when the first laser beam exits from the first scanning lens at a deflection angle corresponding to a center of an image; and $\beta'$ represents an angle that the principal ray of the second laser beam makes with the main scanning plane when the second laser beam exits from the second scanning lens at the deflection angle corresponding to the center of the image.

4. A laser scanning apparatus as claimed in claim 2, wherein the following condition is fulfilled:

$$0.8 < (\alpha \beta')/(\alpha' \beta) < 1.25.$$

5. A laser scanning apparatus as claimed in claim 1, wherein the following condition is fulfilled:

$$|\alpha''/\alpha'| < 0.5$$

$$|\beta''/\beta'| < 0.5$$

where, assuming that no bending of an optical path by a reflective surface having no curvature occurs in the scanning optical system, $\alpha'$ represents an angle that the principal ray of the first laser beam makes with the main scanning plane when the first laser beam exits from the first scanning lens at a deflection angle corresponding to a center of an image;

β' represents an angle that the principal ray of the second laser beam makes with the main scanning plane when the second laser beam exits from the second scanning lens at the deflection angle corresponding to the center of the image;

α" represents an angle that the principal ray of the first laser beam makes with the main scanning plane when the first laser beam exits from the first scanning lens at a deflection angle corresponding to an end of an image; and β" represents an angle that the principal ray of the second laser beam makes with the main scanning plane when the second laser beam exits from the second scanning lens at the deflection angle corresponding to the end of the image.

6. A laser scanning apparatus as claimed in claim 2, wherein the following condition is fulfilled:

$|α"/α'|<0.5$ $|β"/β'|<0.5$ where, assuming that no bending of the optical path by a reflective surface having no curvature occurs in the scanning optical system, α" represents an angle that the principal ray of the first laser beam makes with the main scanning plane when the first laser beam exits from the first scanning lens at a deflection angle corresponding to an end of an image; and β" represents an angle that the principal ray of the second laser beam makes with the main scanning plane when the second laser beam exits from the second scanning lens at the deflection angle corresponding to the end of the image.

7. A laser scanning apparatus as claimed in claim 3, wherein the following condition is fulfilled:

$|α"/α'|<0.5$ $|β"/β'|<0.5$ where, assuming that no bending of the optical path by a reflective surface having no curvature occurs in the scanning optical system, α" represents an angle that the principal ray of the first laser beam makes with the main scanning plane when the first laser beam exits from the first scanning lens at a deflection angle corresponding to an end of an image; and β" represents an angle that the principal ray of the second laser beam makes with the main scanning plane when the second laser beam exits from the second scanning lens at the deflection angle corresponding to the end of the image.

8. A laser scanning apparatus as claimed in claim 4, wherein the following condition is fulfilled:

$|α"/α'|<0.5$.

$|β"/β'|<0.5$.

where, assuming that no bending of the optical path by a reflective surface having no curvature occurs in the scanning optical system, α" represents an angle that the principal ray of the first laser beam makes with the main scanning plane when the first laser beam exits from the first scanning lens at a deflection angle corresponding to an end of an image; and β" represents an angle that the principal ray of the second laser beam makes with the main scanning plane when the second laser beam exits from the second scanning lens at the deflection angle corresponding to the end of the image.

9. A tandem-type laser scanning apparatus comprising:

a deflector for deflecting four laser beams in a main scanning direction by reflecting the laser beams simultaneously with a single surface, the four laser beams including a first laser beam and a second laser beam fulfilling the following conditions:

$|α|≠|β|$ $α≠0$ $β≠0$ where

α represents an angle that a principal ray of the first laser beam makes with a main scanning plane when the first laser beam is incident on the deflector; and β represents an angle that a principal ray of the second laser beam makes with the main scanning plane when the second laser beam is incident on the deflector; and a scanning optical system for directing the deflected four laser beams to separate scanned surfaces corresponding thereto in such a way that the scanned surfaces are individually scanned with the laser beams focused thereon;

wherein the scanning optical system includes:
  a common lens that has no curvature in a sub scanning direction and that transmits both the first and second laser beams;
  a first scanning lens that transmits, of the first and second laser beams transmitted through the common lens, the first laser beam but not the second laser beam; and
  a second scanning lens that transmits, of the first and second laser beams transmitted through the common lens, the second laser beam but not the first laser beam;
  the first and second scanning lenses each having a surface having a different twist from each other.

10. A laser scanning apparatus as claimed in claim 9, wherein the following condition is fulfilled:

$α−α'≠β−β'$ where, assuming that no bending of an optical path by a reflective surface having no curvature occurs in the scanning optical system, α' represents an angle that the principal ray of the first laser beam makes with the main scanning plane when the first laser beam exits from the first scanning lens at a deflection angle corresponding to a center of an image; and β' represents an angle that the principal ray of the second laser beam makes with the main scanning plane when the second laser beam exits from the second scanning lens at the deflection angle corresponding to the center of the image.

11. A laser scanning apparatus as claimed in claim 9, wherein the following condition is fulfilled:

$0.8<(αβ')/(α'β)<1.25$ where, assuming that no bending of an optical path by a reflective surface having no curvature occurs in the scanning optical system, α' represents an angle that the principal ray of the first laser beam makes with the main scanning plane when the first laser beam exits from the first scanning lens at a deflection angle corresponding to a center of an image; and β' represents an angle that the principal ray of the second laser beam makes with the main scanning plane when the second laser beam exits from the second scanning lens at the deflection angle corresponding to the center of the image.

12. A laser scanning apparatus as claimed in claim 10, wherein the following condition is fulfilled:

0.8<(αβ')/(α'β)<1.25.

13. A laser scanning apparatus as claimed in claim 9, wherein the following condition is fulfilled:

|α"/α'|<0.5

|β"/β'|<0.5 where, assuming that no bending of an optical path by a reflective surface having no curvature occurs in the scanning optical system, α' represents an angle that the principal ray of the first laser beam makes with the main scanning plane when the first laser beam exits from the first scanning lens at a deflection angle corresponding to a center of an image;

β' represents an angle that the principal ray of the second laser beam makes with the main scanning plane when the second laser beam exits from the second scanning lens at the deflection angle corresponding to the center of the image;

α" represents an angle that the principal ray of the first laser beam makes with the main scanning plane when the first laser beam exits from the first scanning lens at a deflection angle corresponding to an end of an image; and β" represents an angle that the principal ray of the second laser beam makes with the main scanning plane when the second laser beam exits from the second scanning lens at the deflection angle corresponding to the end of the image.

14. A laser scanning apparatus as claimed in claim 10, wherein the following condition is fulfilled:

|α"/α'|<0.5

|β"/β'|<0.5 where, assuming that no bending of the optical path by a reflective surface having no curvature occurs in the scanning optical system, α" represents an angle that the principal ray of the first laser beam makes with the main scanning plane when the first laser beam exits from the first scanning lens at a deflection angle corresponding to an end of an image; and β" represents an angle that the principal ray of the second laser beam makes with the main scanning plane when the second laser beam exits from the second scanning lens at the deflection angle corresponding to the end of the image.

15. A laser scanning apparatus as claimed in claim 11, wherein the following condition is fulfilled:

|α"/α'|<0.5

|β"/β'|<0.5 where, assuming that no bending of the optical path by a reflective surface having no curvature occurs in the scanning optical system, α" represents an angle that the principal ray of the first laser beam makes with the main scanning plane when the first laser beam exits from the first scanning lens at a deflection angle corresponding to an end of an image; and β" represents an angle that the principal ray of the second laser beam makes with the main scanning plane when the second laser beam exits from the second scanning lens at the deflection angle corresponding to the end of the image.

16. A laser scanning apparatus as claimed in claim 12, wherein the following condition is fulfilled:

|α"/α'|<0.5

|β"/β'|<0.5 where, assuming that no bending of the optical path by a reflective surface having no curvature occurs in the scanning optical system, α" represents an angle that the principal ray of the first laser beam makes with the main scanning plane when the first laser beam exits from the first scanning lens at a deflection angle corresponding to an end of an image; and β" represents an angle that the principal ray of the second laser beam makes with the main scanning plane when the second laser beam exits from the second scanning lens at the deflection angle corresponding to the end of the image.

* * * * *